(12) United States Patent
Kania et al.

(10) Patent No.: US 8,372,277 B2
(45) Date of Patent: Feb. 12, 2013

(54) FLOATING TREATMENT STREAMBED

(75) Inventors: Bruce G. Kania, Shepherd, MT (US); Frank M. Stewart, Bozeman, MT (US)

(73) Assignee: Fountainhead L.L.C., Shepherd, MT (US)

( * ) Notice: Subject to any disclaimer, the term of this patent is extended or adjusted under 35 U.S.C. 154(b) by 85 days.

(21) Appl. No.: 12/940,111

(22) Filed: Nov. 5, 2010

(65) Prior Publication Data

US 2011/0108472 A1 May 12, 2011

Related U.S. Application Data

(60) Provisional application No. 61/260,800, filed on Nov. 12, 2009.

(51) Int. Cl.
*C02F 3/06* (2006.01)
*C02F 3/32* (2006.01)

(52) U.S. Cl. .......... 210/151; 210/150; 210/170.05; 210/170.09; 210/194; 210/242.1; 210/602; 210/615; 210/747.6; 405/52

(58) Field of Classification Search .......... 210/150, 210/151, 170.05, 170.09, 170.1, 194, 242.1, 210/602, 615, 747.6; 405/52
See application file for complete search history.

(56) References Cited

U.S. PATENT DOCUMENTS

| | | | |
|---|---|---|---|
| 3,385,786 A * | 5/1968 | Klock | 210/602 |
| 4,030,859 A | 6/1977 | Henegar | |
| 4,333,263 A | 6/1982 | Adey | |
| 4,388,192 A * | 6/1983 | Hellqvist | 210/615 |
| 4,582,609 A | 4/1986 | Hunter, III et al. | |
| 5,096,577 A | 3/1992 | Ngo et al. | |
| 5,143,623 A | 9/1992 | Kroll | |
| 5,342,512 A | 8/1994 | Ngo et al. | |
| 5,344,557 A * | 9/1994 | Scanzillo | 210/150 |
| 5,409,601 A | 4/1995 | Ngo et al. | |
| 5,527,456 A | 6/1996 | Jensen | |
| 5,528,856 A | 6/1996 | Smith et al. | |
| 5,573,669 A | 11/1996 | Jensen | |
| 5,766,474 A | 6/1998 | Smith et al. | |
| 5,811,007 A | 9/1998 | Stewart et al. | |
| 5,820,759 A | 10/1998 | Stewart et al. | |
| 5,846,423 A | 12/1998 | Jensen | |
| 5,851,398 A | 12/1998 | Adey | |
| 6,231,766 B1 * | 5/2001 | Hausin | 210/150 |
| 6,277,274 B1 | 8/2001 | Coffman | |
| 6,569,321 B2 | 5/2003 | Coffman | |
| 6,751,903 B2 | 6/2004 | Shryock | |
| 6,783,676 B2 | 8/2004 | Jensen | |
| 7,014,767 B2 | 3/2006 | Jensen | |
| 7,172,691 B2 | 2/2007 | Dunlop et al. | |
| 7,314,562 B2 | 1/2008 | Svirklys et al. | |
| 7,575,685 B2 | 8/2009 | Morris et al. | |
| 7,776,216 B1 * | 8/2010 | Jensen et al. | 210/170.05 |
| 2001/0045383 A1 | 11/2001 | Coffman | |
| 2003/0159987 A1 | 8/2003 | Jensen | |
| 2005/0092677 A1 | 5/2005 | Jensen | |
| 2005/0269260 A1 | 12/2005 | Austin | |
| 2006/0144783 A1 | 7/2006 | Jensen | |
| 2007/0144965 A1 | 6/2007 | Morris et al. | |
| 2007/0295672 A1 * | 12/2007 | Tormaschy et al. | 210/170.05 |
| 2009/0139927 A1 * | 6/2009 | Kania et al. | 210/602 |
| 2012/0012516 A1 * | 1/2012 | Torres Junco et al. | 210/242.1 |

* cited by examiner

*Primary Examiner* — Christopher Upton
(74) *Attorney, Agent, or Firm* — Antoinette M. Tease

(57) ABSTRACT

A floating streambed comprising a circulation pump having an inlet hose or pipe, an inlet hose or pipe depth adjuster, and one or more treatment channels comprised of permeable matrix. The floating streambed floats on a water body. Water enters the inlet hose or pipe from the water body and is pumped by the circulation pump into the treatment channels. The treatment channels are comprised of permeable matrix, and water entering the treatment channels flows both horizontally through the treatment channel and into the water body and also vertically downward through the permeable matrix of the treatment channels.

37 Claims, 20 Drawing Sheets

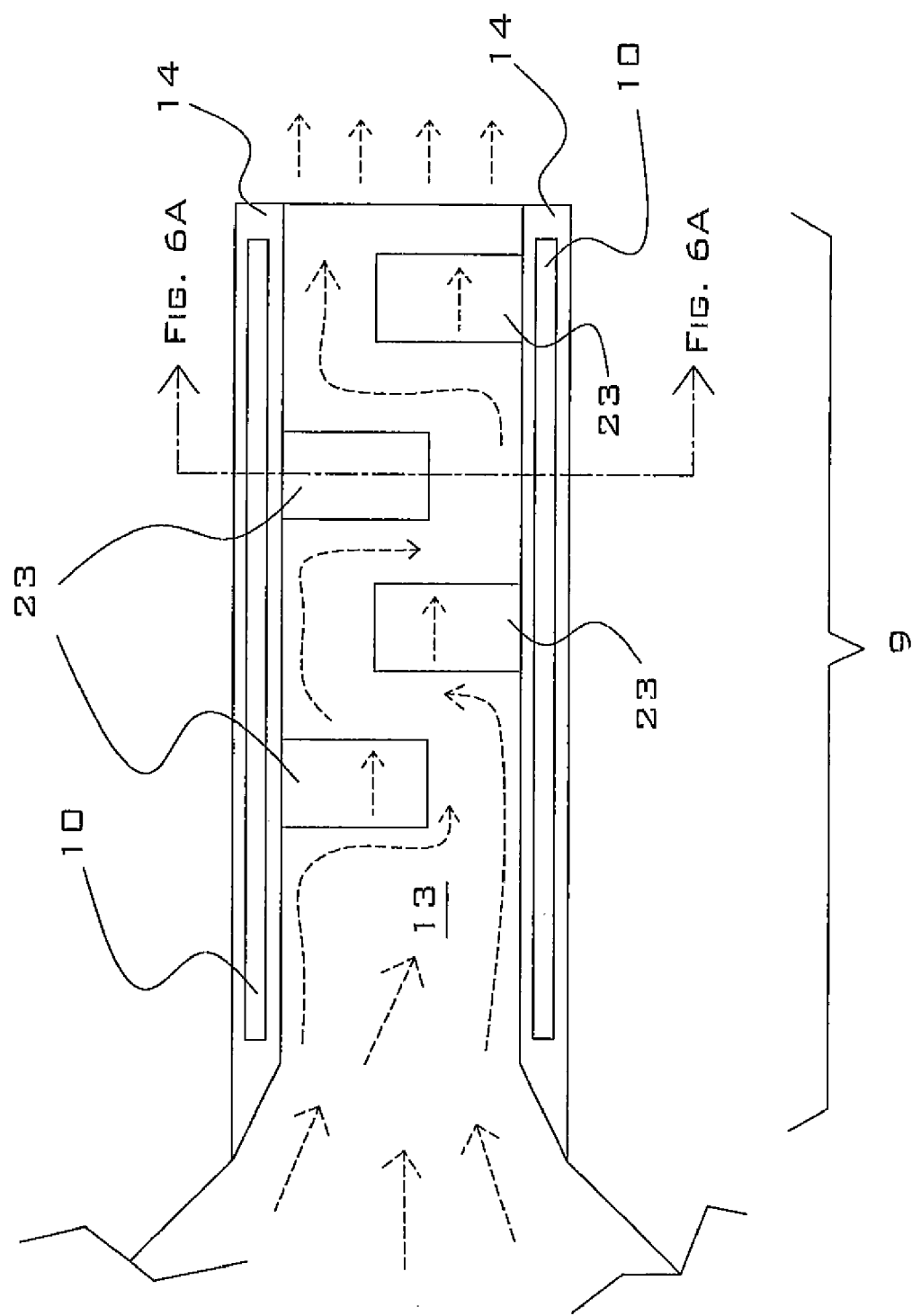

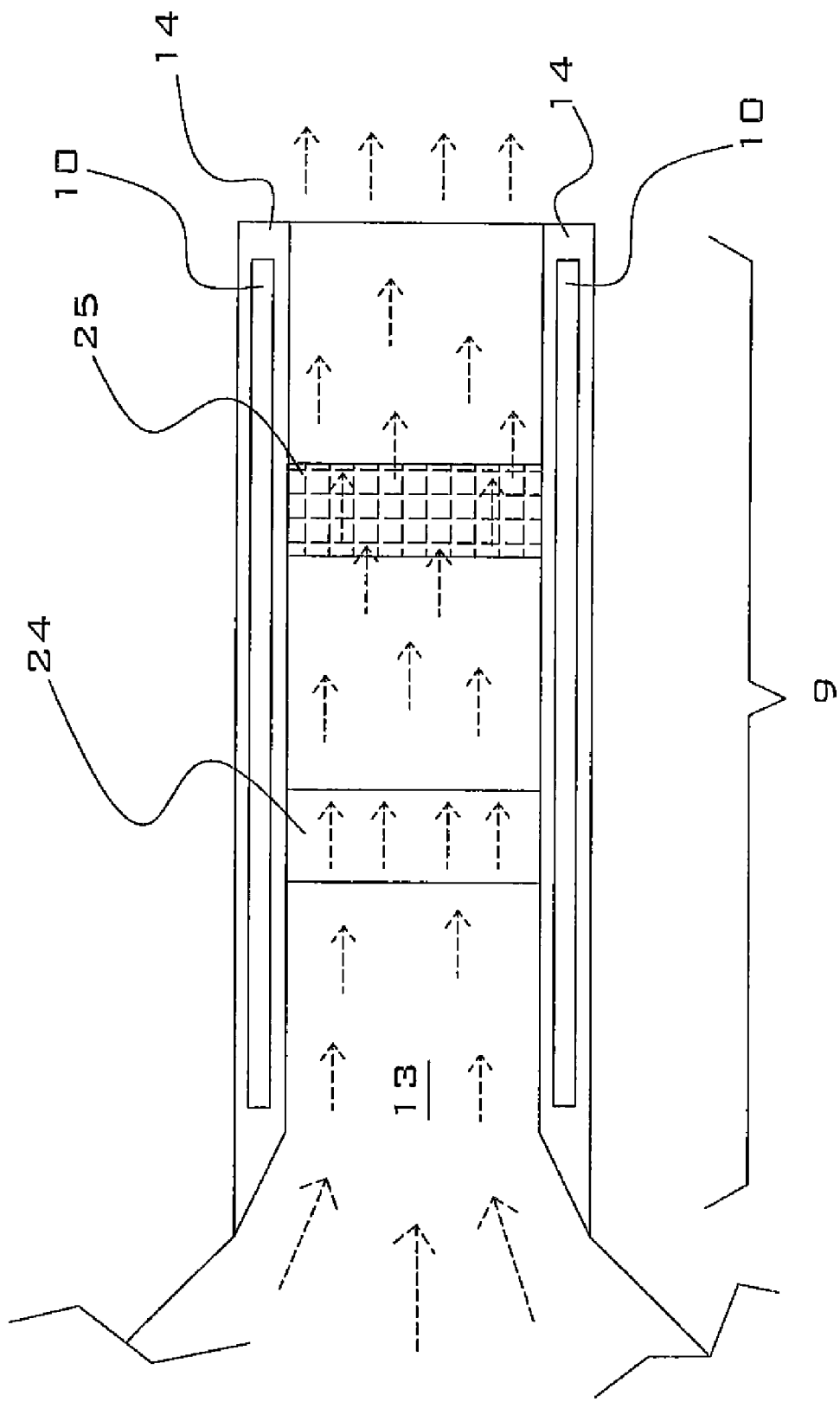

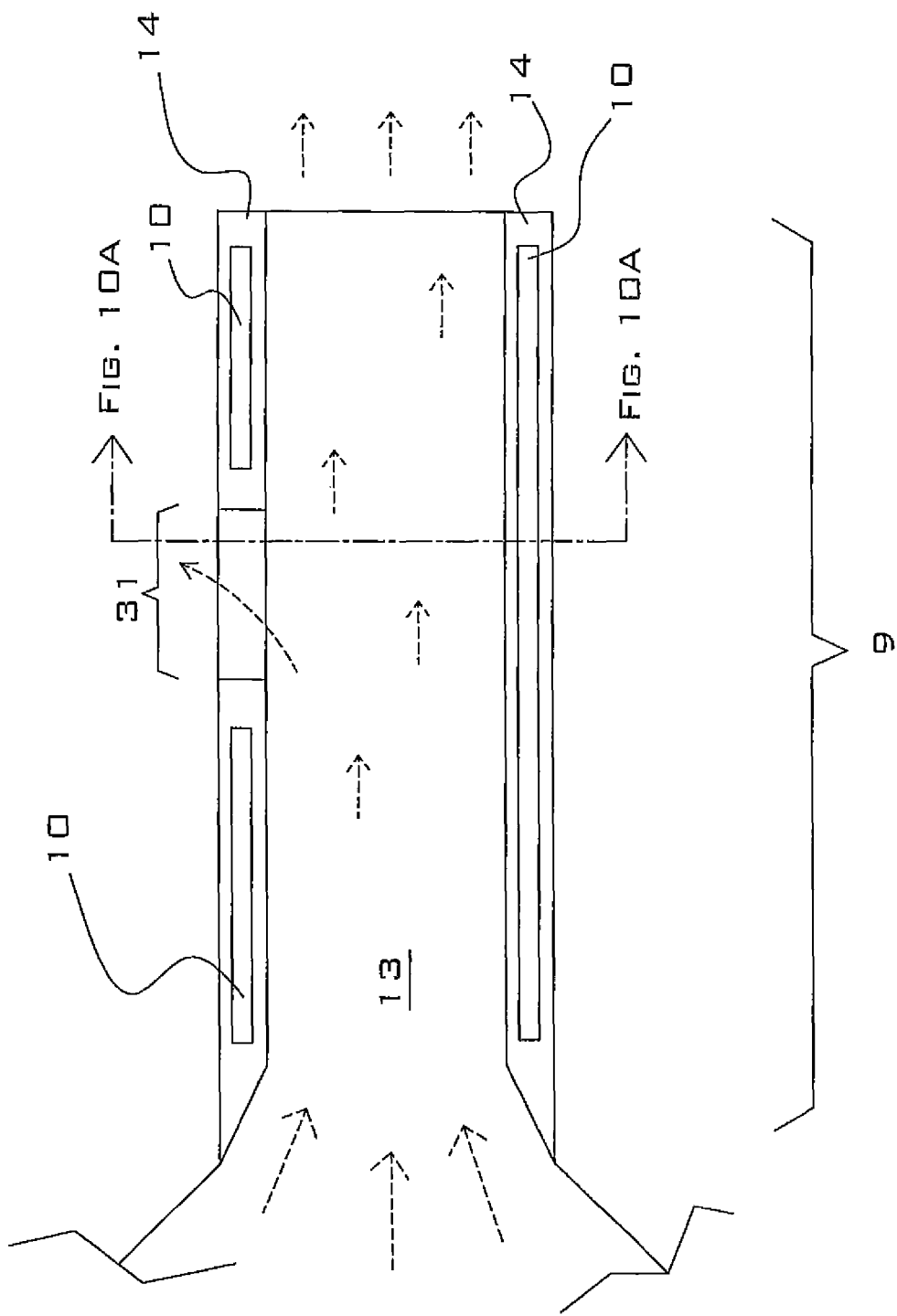

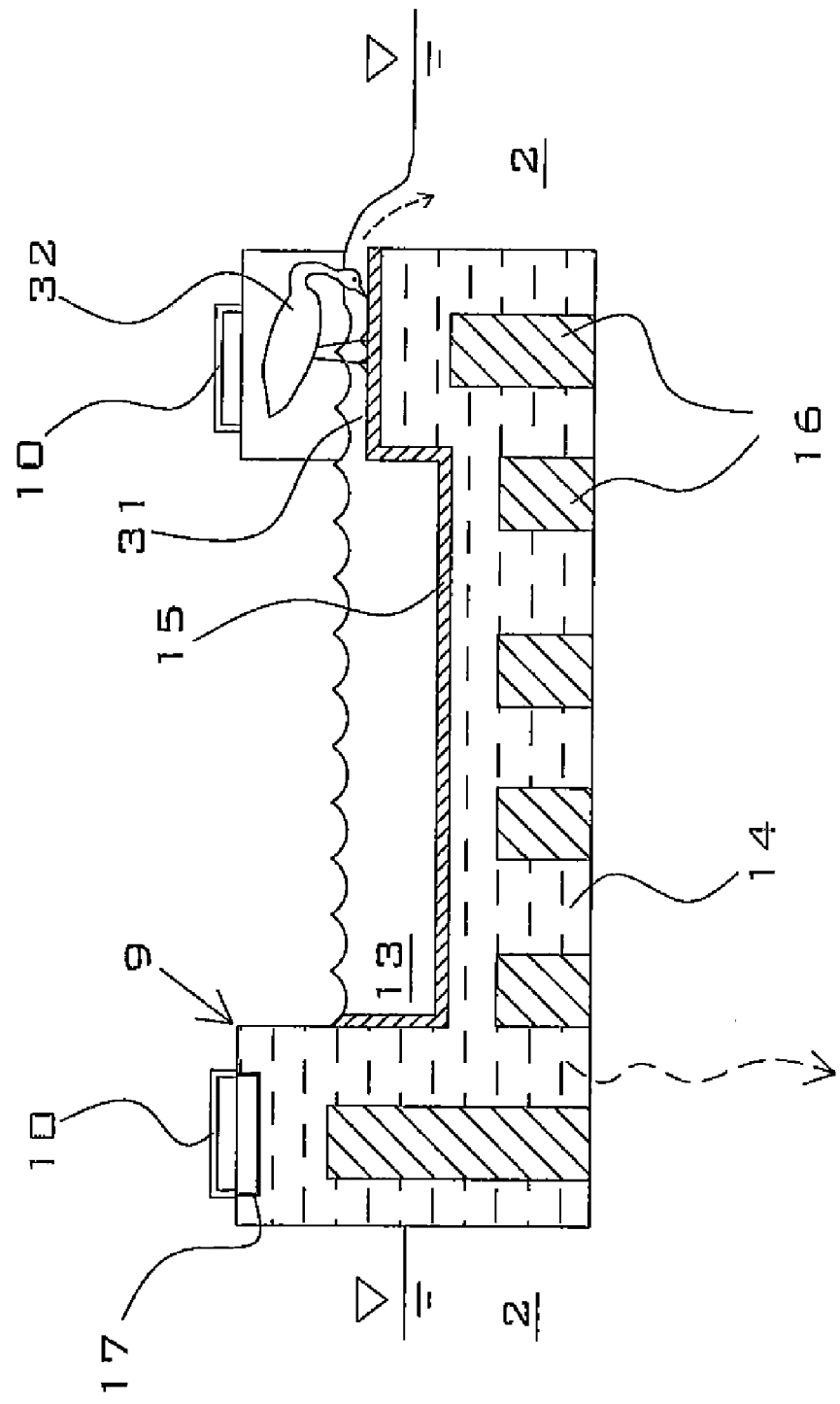

FIGURE 12A
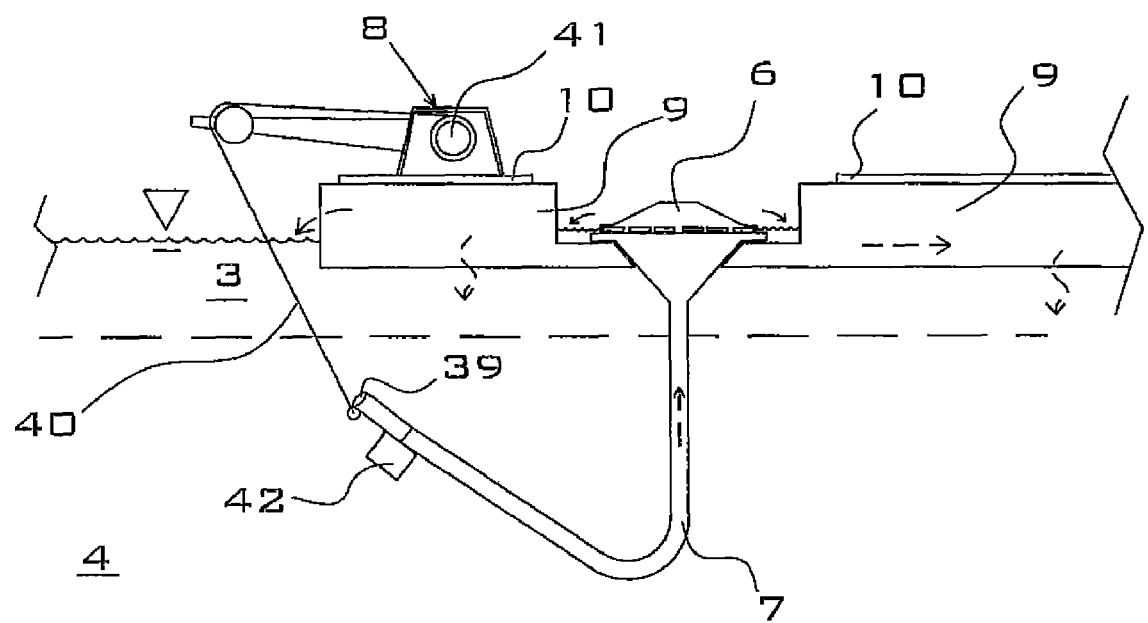

FLOATING TREATMENT STREAMBED

CROSS-REFERENCE TO RELATED APPLICATION

This application claims priority under 35 U.S.C. §119(e) back to U.S. Patent Application No. 61/260,800 filed on Nov. 12, 2009.

BACKGROUND OF THE INVENTION

1. Field of the Invention

The present invention relates generally to the field of water treatment, and more specifically, to a floating streambed that utilizes a permeable nonwoven matrix to accomplish filtration of treatment water and allows both inlet and discharge water depth to be adjusted.

2. Description of the Related Art

Many lakes and ponds contain stratified layers of water, in which the cooler lower levels are often deficient in dissolved oxygen and, therefore, unable to provide habitat for fish and other aquatic wildlife species. In some cases, these water bodies tend to contain excess dissolved nutrients, such as nitrogen and phosphorus, from either agricultural or municipal wastes. In many of these lakes, the upper warmer water layers tend to be choked with algae and other nuisance plants such as duckweed (*Lemna* sp.), which thrive in the relatively sunlit and nutrient-rich upper zones, then die and fall to the bottom, where their decay contributes to the oxygen deficiency problem in the deeper zones. Not uncommonly, the majority of the water volume in these bodies is unable to support fish life because the upper layers are deficient in dissolved oxygen due to elevated water temperatures, and the lower layers are simultaneously deficient in dissolved oxygen due to lack of circulation.

Water temperature in combination with dissolved oxygen level can also limit which species of fish may occur in a waterway. In addition to reduced fish sustainability, these stratified waters also have reduced potential for municipal, agricultural, and recreational use because of the presence of toxins and suspended solids resulting from poor circulation and lack of microbiological activity.

Accordingly, it is an object of the present invention to provide a floating streambed that can be used to de-stratify and remove contaminants from a water body. It is a further object of the present invention to provide concentrated habitat for microbial colonization, as well as habitat for fish, shellfish, shorebirds, insects, crustaceans and other biota associated with waterways. Yet another object is to provide a floating streambed with an adjustable-depth water inlet system and an adjustable-depth water discharge system. Yet another object is to provide a floating streambed with walkways that make it easy for a person to walk on top of the floating streambed for operation, maintenance and/or measurement purposes.

BRIEF SUMMARY OF THE INVENTION

The present invention is a floating streambed comprising: a circulation pump having an inlet hose or pipe; an inlet hose or pipe depth adjuster; and one or more treatment channels comprised of permeable matrix; wherein the floating streambed floats on a water body; wherein water enters the inlet hose or pipe from the water body and is pumped by the circulation pump into the treatment channels; and wherein the treatment channels are comprised of permeable matrix, and water entering the treatment channels flows both horizontally through the treatment channel and into the water body and also vertically downward through the permeable matrix of the treatment channels.

In an alternate embodiment, the present invention is a floating streambed comprising: a circulation pump having an inlet hose or pipe; an inlet hose or pipe depth adjuster; and one or more treatment channels comprised of permeable matrix; wherein the floating streambed floats on a stratified water body comprising a surface layer, an intermediate layer and a deep layer; wherein water enters the inlet hose or pipe from the surface, intermediate or deep layer of the water body and is pumped by the circulation pump into the treatment channels; and wherein the treatment channels are comprised of permeable matrix, and water entering the treatment channels flows both horizontally through the treatment channel and into the surface layer of the water body and vertically downward through the permeable matrix of the treatment channels.

In a preferred embodiment, each treatment channel has at least two sides comprised of permeable matrix, and the water entering the treatment channel also flows horizontally through the permeable matrix on either side of the treatment channel. Preferably, each treatment channel has at least two sides, and the invention further comprises walkways positioned on one or both sides of each treatment channel. The walkways are preferably comprised of molded, fiberglass-reinforced plastic grating.

In a preferred embodiment, the invention further comprises a plurality of flotation units that are integral to the treatment channels. Preferably, the flotation units are comprised of polyurethane resin that is injected into the permeable matrix under pressure and in liquid form and then expands and cures in place.

In a preferred embodiment, the invention further comprises a discharge pipe that discharges a portion of the water from the treatment channels into the intermediate or deep layer of the water body. Preferably, the depth of the discharge pipe is adjustable.

In a preferred embodiment, the invention further comprises a bubbler located within the inlet pipe or hose or within a treatment channel that bubbles air into the water that is pumped into the treatment channels. Preferably, at least one of the treatment channels comprises a top cover.

In a preferred embodiment, each treatment channel comprises a bottom and sides, and at least one of the treatment channels comprises a periphyton layer on the bottom and sides of the treatment channel. Preferably, the invention further comprises a removable liner to facilitate removal and harvest of periphyton. In an alternate embodiment, each treatment channel comprises a bottom and sides, and at least one of the treatment channels comprises an impermeable liner on the bottom and sides of the treatment channel.

In a preferred embodiment, the permeable matrix is comprised of nonwoven polymer fibers. In one embodiment, the nonwoven polymer fibers are polyester fibers that are intertwined to form a randomly oriented blanket. In an alternate embodiment, the nonwoven polymer fibers are recycled scrap carpet fibers.

In a preferred embodiment, aquatic, riparian and/or terrestrial plants are added to the treatment channel to increase removal of excess nutrients from the water in the treatment channel. In an alternate embodiment, each treatment channel has at least two sides comprised of permeable matrix with a top surface, and aquatic, riparian and/or terrestrial plants are added to the top surface of the permeable matrix of the sides of the treatment channel to increase removal of excess nutrients from water in or entering the water body.

In an alternate embodiment, each treatment channel comprises a bottom and sides, and the invention further comprises sod that is attached to the bottom and/or sides of the treatment channel. In yet another alternate embodiment, bedding plants or plugs and/or seeds are inserted into precut holes within the permeable matrix of the treatment channel.

In an alternate embodiment, at least one treatment channel comprises one or more three-dimensional baffles, and the baffles produce a longer flow path for the water in the treatment channel. In yet another alternate embodiment, each treatment channel comprises two sides, at least one treatment channel comprises a filter comprised of permeable matrix, and the filter extends from one side of the treatment channel to the other. In yet another alternate embodiment, each treatment channel comprises two sides, at least one treatment channel comprises an absorbent filter comprised of an outer support frame and an absorbent fill material, and the filter extends from one side of the treatment channel to the other. Preferably, the outer support frame is comprised of permeable matrix.

In an alternate embodiment, each treatment channel comprises two sides, at least one of the treatment channels comprises a floating treatment island, and the floating treatment island floats on the water in the treatment channel and is comprised of permeable matrix, a plurality of flotation units, and tethering cables that tether the floating treatment island between the sides of the treatment channel. In yet another alternate embodiment, each treatment channel comprises two sides, at least one of the treatment channels comprises an overhanging treatment bank, and the overhanging treatment bank floats on the water in the treatment channel and is comprised of permeable matrix, a plurality of flotation units, and tethering cables that tether the overhanging treatment bank to one side of the treatment channel such that the overhanging treatment bank abuts up against the side of the treatment channel.

In an alternate embodiment, each treatment channel comprises two side walls, and at least one treatment channel comprises a side exit channel and a lowered elevation of a side wall to provide a relatively shallow stream section as compared to the water in the treatment channel. In yet another alternate embodiment, the inlet hose or pipe has an inlet end, and the invention further comprises an inlet filter surrounding or inside the inlet end of the inlet hose or pipe, wherein the inlet filter is comprised of permeable matrix.

In an alternate embodiment, the water body has a bottom, and the invention further comprises a sludge input system comprising a sludge pump and a sludge inlet pipe or hose with an inlet end at the bottom of the water body, wherein the sludge pump pumps sludge from the bottom of the water body and mixes it with the water that is pumped into the treatment channels. In yet another alternate embodiment, the water body has a bottom, and the invention further comprises a surface water input system comprising a surface water pump and a surface water inlet hose or pipe with an inlet end in the surface layer of the water body, wherein the surface water pump pumps surface water from the surface layer of the water body and mixes it with the water that is pumped into the treatment channels.

In a preferred embodiment, each treatment channel comprises a bottom and sides, the bottom and sides of the treatment channel are comprised of permeable matrix with a certain thickness, the water entering the treatment channel remains in the treatment channel for a certain residence time, and the residence time of the water in the treatment channel is adjusted by varying the thickness of the permeable matrix of the bottom and/or sides of the treatment channel. In another preferred embodiment, each treatment channel has a length, the water entering the treatment channel remains in the treatment channel for a certain residence time, and the residence time of the water in the treatment channel is adjusted by varying the length of the treatment channel. In yet another preferred embodiment, the circulation pump pumps water into the treatment channel at a certain rate, the water entering the treatment channel remains in the treatment channel for a certain residence time, and the residence time of the water in the treatment channel is adjusted by varying the rate at which the circulation pump pumps water into the treatment channel.

In an alternate embodiment, the present invention is a floating streambed system comprising: a floating streambed with at least one treatment channel with a bottom and sides comprised of permeable matrix; one or more inlet valves situated in an upper water body; and (c) an inlet hose or pipe connecting the inlet valve(s) to the treatment channel; wherein the floating streambed floats on a lower water body; and wherein water flows by gravity from the upper water body into the inlet hose or pipe and into the treatment channel, where it flows horizontally through the treatment channel, horizontally through the permeable matrix of the sides of the treatment channel and/or vertically downward through the bottom of the permeable matrix of the treatment channel into the lower water body.

BRIEF DESCRIPTION OF THE DRAWINGS

FIG. 6 is a schematic top view of a fourth embodiment of a treatment channel incorporating three-dimensional baffles.

FIG. 7 is a schematic top view of a fifth embodiment of a treatment channel.

FIG. 10 is a schematic top view of an eighth embodiment of a treatment channel that incorporates a side exit channel.

FIG. 10A is a schematic cross-section side view of the treatment channel shown in FIG. 10.

FIG. 12A is a schematic side view of the adjustable-depth inlet water system of FIG. 12 with the inlet end of the inlet hose/pipe at a shallower depth.

Figure 1:
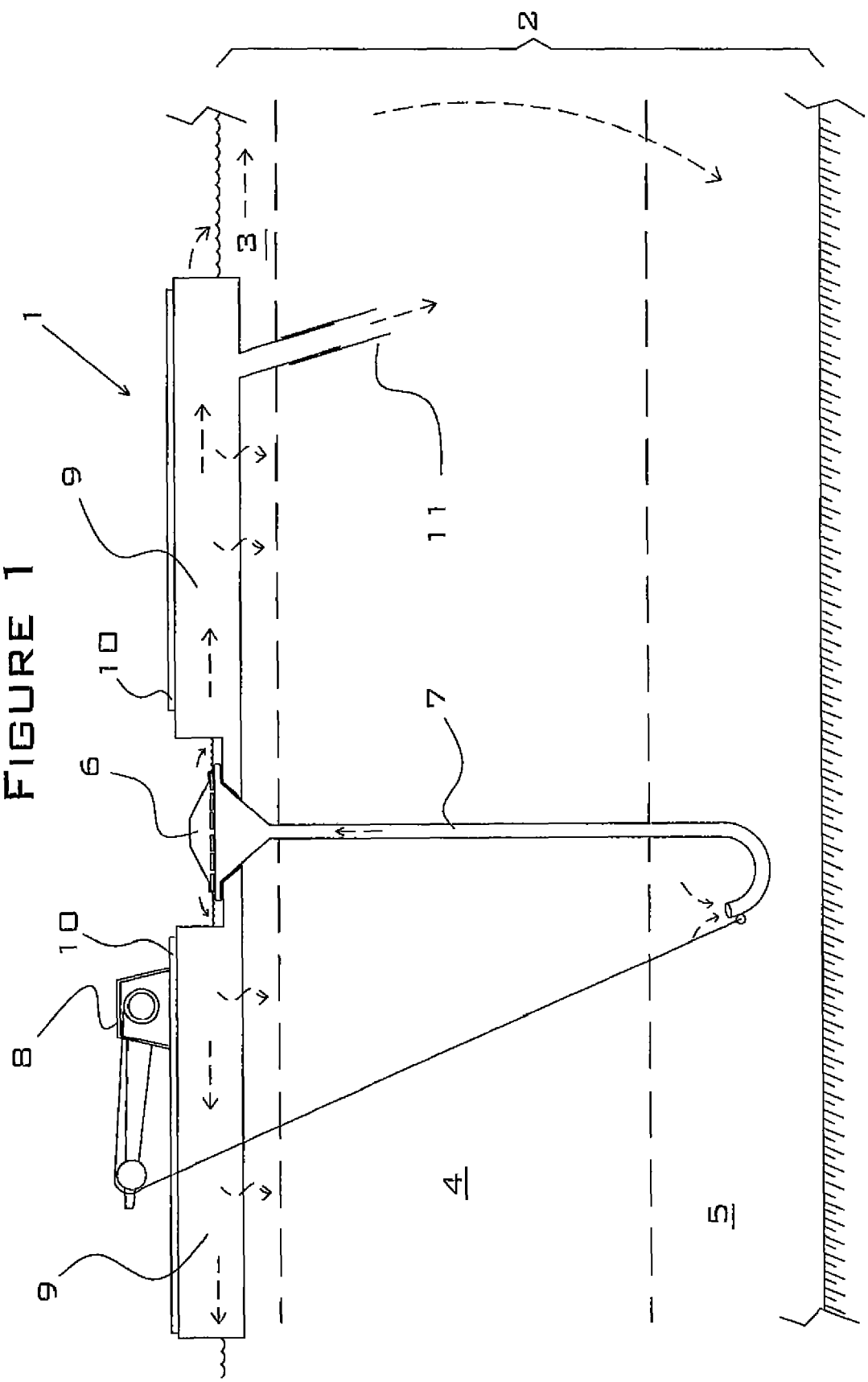
FIG. 1 is a schematic side view of the present invention.

| REFERENCE NUMBERS | |
|---|---|
| 1 | Floating treatment streambed |
| 2 | Stratified water body |
| 3 | Surface layer |
| 4 | Intermediate layer |
| 5 | Deep layer |
| 6 | Circulation pump |
| 7 | Inlet hose/pipe |
| 8 | Inlet hose depth adjuster |
| 9 | Treatment channel |
| 10 | Walkway |
| 11 | Discharge pipe |
| 12 | Radial water flow from pump outlet |
| 13 | Treatment water |
| 14 | Permeable matrix |
| 15 | Periphyton layer |
| 16 | Flotation unit |
| 17 | Steel cable/polymer cord/polymer webbing |
| 18 | Impermeable channel liner |
| 19 | Top cover |
| 20 | Aquatic plant |
| 21 | Riparian/terrestrial plant |
| 22 | Wetland sod |
| 23 | Baffle |
| 24 | Permeable matrix channel filter |
| 25 | Absorbent channel filter |
| 26 | Outer support frame |
| 27 | Absorbent fill material |
| 28 | Floating treatment island |
| 29 | Tethering cable |
| 30 | Overhanging treatment bank |
| 31 | Side exit channel |
| 32 | Shorebird |
| 33 | Sludge input system |
| 34 | Surface water input system |
| 35 | Sludge pump |
| 36 | Sludge inlet pipe/hose |
| 37 | Surface water pump |
| 38 | Surface water inlet hose/pipe |
| 39 | Inlet end of water inlet hose/pipe |
| 40 | Cable/rope |
| 41 | Winch |
| 42 | Weight |
| 43 | Flexible joint |
| 44 | Inner pipe |
| 45 | Outer telescoping pipe |
| 46 | Fluid seal |
| 47 | Union |
| 48 | Short extension pipe |
| 49 | Long extension pipe |
| 50 | Inlet filter |
| 51 | Outlet pipe depth adjuster |
| 52 | Upper stratified water body |
| 53 | Lower water body |
| 54 | Surface-layer inlet control valve |
| 55 | Intermediate-layer inlet control valve |
| 56 | Deep-layer inlet control valve |
| 57 | Manifold |

DETAILED DESCRIPTION OF INVENTION

The present invention produces several beneficial effects in water bodies. First, it increases the percentage of the water that can sustain fish populations by creating aerated deep zones and cooler shallow zones. Second, it clarifies the water by suppressing the growth of excess algae and other nuisance plants. Third, it promotes the growth of fish and other wildlife by converting excess nutrients into food sources which move up through the food chain. The oxygen-deficiency and eutrification problems described are mitigated by a combination of water circulation and bioremediation. The present invention provides a multi-step, integrated process which may be adjusted to create optimal remediation conditions for a particular site.

In general, the present invention involves: drawing in water that needs treatment from a specific depth zone; bringing that water to surface; optionally splitting it into multiple flow paths and optionally exposing it to air; optionally mixing the water with water from other zones; optionally mixing the water with organic sediment from the benthic zone of the water body; forcing the water to flow along one or more pathways that exposes it to a desired combination of mechanical filtration, sunlight (or absence of light), periphyton, beneficial microbes, aquatic, riparian and terrestrial plants, aeration (or lack of aeration), carbon, chemicals or compounds associated with pH adjustment; and discharging the treated water to a desired depth zone.

During the treatment process, the water may be sampled and analyzed, and the treatment process may be modified to improve the efficiency of the process for removing specific contaminants. When water is removed from a specific zone for treatment (e.g., when water is extracted from a deep anaerobic zone near the bottom of the water body), water from other zones naturally moves in to fill the vacated volume, thereby drawing fresh water into a previously stagnant zone. In addition, when water is pumped in a circulation pattern within a water body for an extended time period (e.g., for several days), the moving water induces movement in surrounding waters that magnifies the effect of the pumped circulation water. For example, some studies have shown that pumping water at a rate of 3000 gallons per minute (gpm) can induce a total flow of about 10,000 gpm.

The residence time of the treated water in a treatment channel may be adjusted as required by varying the length of the treatment channels, the thickness of the matrix on the bottom and sides of the treatment channel, and the pump flow rate. For example, some contaminants such as nitrate are removed relatively rapidly by denitrifying biofilm bacteria; therefore, the treatment channels can be relatively short and/or the flow rate of treatment water through the treatment channels can be relatively fast. Conversely, ammonia removal by autotrophic nitrifying bacteria is relatively slow and may require relatively long treatment channels and/or relatively slow flow velocity, resulting in more time for the water to be treated before it leaves the structure.

The pump rate of the present invention may be periodically varied for certain applications. For example, the pump may be run normally at 50% of maximum flow, and the flow may be temporarily increased to 100% of maximum flow for ten minutes, once per day. This periodic surging of the flow may be useful for purging excess periphyton growth from the growing surfaces in the treatment channels, thereby preventing undesirable fouling or plugging of the permeable components. In addition, this periodic surging may be useful for expelling aquatic animals such as insect larvae and crustaceans, which may serve as a valuable food source for fish that feed on the flushed-out flora and fauna.

The present invention may optionally be utilized as fish spawning habitat by providing relatively fast-moving, shallow water for species such as rainbow trout that normally cannot reproduce in lakes and ponds because their eggs require flowing water to survive. The present invention may also be used as growing habitat for fish species that prefer flowing water, and top covers may be added to protect the fish from birds of prey or, alternatively, to minimize algae growth in favor of biofilm development.

The structure of the present invention may be modified as required for optimal efficacy under varying seasonal conditions. For example, during the warmer summer months, bacterial biofilms and periphyton may tend to flourish and provide relatively rapid and complete removal of many contaminants such as nitrate and phosphorus; however, during the cooler winter months, contaminant removal by bacteria and periphyton may be less efficient, and the treatment provided by the invention may be improved by adding non-biological absorbent filters within the treatment channels as needed. Set forth below is a detailed description of the invention with specific reference to the figures.

FIG. 1 is a schematic side view of the present invention, which is referred to herein as a "floating streambed" or "FTS." As shown, the FTS 1 floats at the surface of a stratified water body 2, which is comprised of a surface layer 3, an intermediate layer 4, and a deep layer 5. The major components of the FTS 1 include a circulation pump 6 having an inlet hose or pipe 7, an inlet hose depth adjuster 8, multiple treatment channels 9 with walkways 10, and an optional discharge pipe 11. Water flow patterns produced by the circulation pump 6 are schematically represented by dashed arrows in the drawing. As the circulation water passes into and out of the FTS, this moving water induces additional water currents throughout the water body, which contribute to destratification of the water body.

When the circulation pump 6 is actuated, water from the deep layer 5 enters the intake pipe 7 and is discharged from the pump 6, where it subsequently enters the treatment channels 9. A portion of the water passes vertically downward through the permeable bottom of the treatment channels 9 and is discharged into the surface layer 3. Another portion of the water passes horizontally through the treatment channels 9 and is discharged into the surface layer 3. A final portion of the water may optionally be allowed to flow through the optional discharge pipe 11 and then be discharged into the intermediate layer 4.

As the water passes through the treatment channels 9, it is mechanically filtered and biologically treated to remove nutrients and other contaminants prior to being discharged into the water body 2. As indicated by the dashed arrows, the FTS causes water to circulate between the surface layer 3, the intermediate layer 4, and the deep layer 5. In order to maximize efficiency, the circulation pump is preferably designed to produce a relatively high flow rate at a relatively low output pressure (i.e., a "high flow rate, low head" pump). One acceptable commercially available pump for this application is the BLUE FROG® pump manufactured by Absolute Aeration of Lexington, Nebr. This pump is reported to have an output of 5,000 gallons per minute at an output head of about six inches, and is powered by a 3-horsepower, variable speed, 230-VAC motor.

The present invention is constructed so that the depths of the intake and discharge are adjustable. Details of the adjustable-depth components are shown in FIGS. 9-13. Details of the structure and operation of the treatment channel 9 are presented in FIGS. 2-7.

Figure 2:
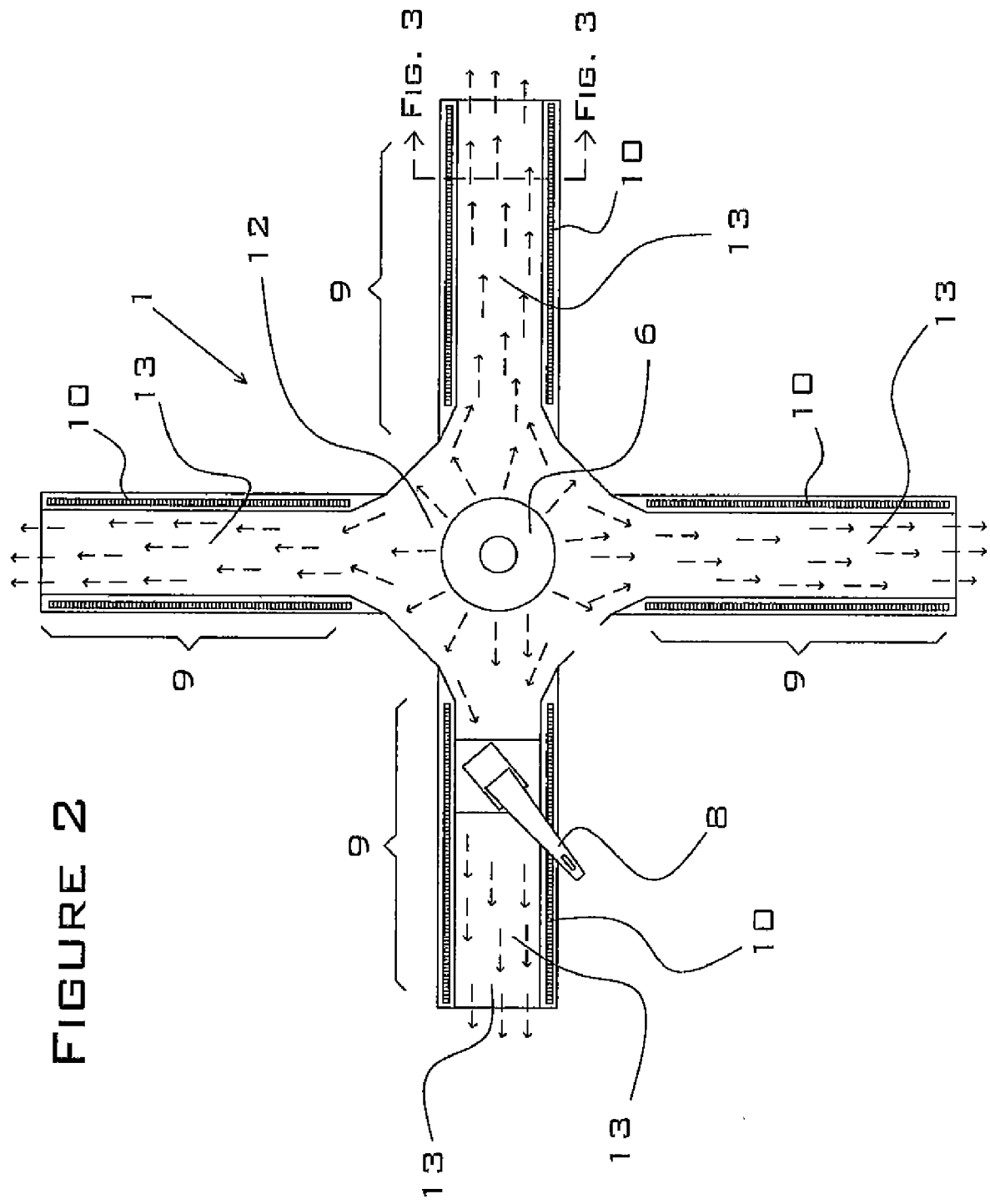
FIG. 2 is a schematic top view of the present invention.

FIG. 2 is a schematic top view of the present invention. In this embodiment, the present invention comprises four independent treatment channels 9, an inlet hose depth adjuster 8, and a circulation pump 6. Walkways 10 are shown along both sides of each treatment channel 9. The purpose of the walkways 10 is to allow personnel access for operation, inspection and servicing of the treatment channels 9. Water flow patterns for the surface flows through the FTS 1 are indicated by the dashed arrows. As shown, a portion of the radial water flow 12 from the circulation pump 6 is diverted into each of the treatment channels 9. The water flowing through the treatment channels 9 is referred to as the treatment water 13. Although FIG. 2 shows an FTS with four treatment channels, the number of treatment channels can range from one to ten or more.

The treatment efficacy may be optimized for a specific set of contaminants by adjusting the pump flow rate, the dissolved oxygen concentration, the number and type of channel filters, and the mixing additives (surface water and benthic sludge). The dissolved oxygen in the treatment water may be increased by bubbling air into the treatment water within the inlet pipe or within the treatment channels. Conversely, if the desire is to maintain low dissolved oxygen concentrations in the treatment water (e.g., for biological denitrification), then the treatment channels may be covered with a low-permeability top cover to minimize exposure of the treatment water to atmospheric oxygen.

When the present invention comprises multiple treatment channels 9, each treatment channel 9 may be configured differently. For example, one treatment channel 9 may be optimized for aerobic removal of ammonia and organic carbon by having a top surface open to the atmosphere and sunlight, while simultaneously, another treatment channel 9 may be optimized for anoxic removal of nitrate by installing an impermeable top cover that excludes atmospheric air.

Figure 3:
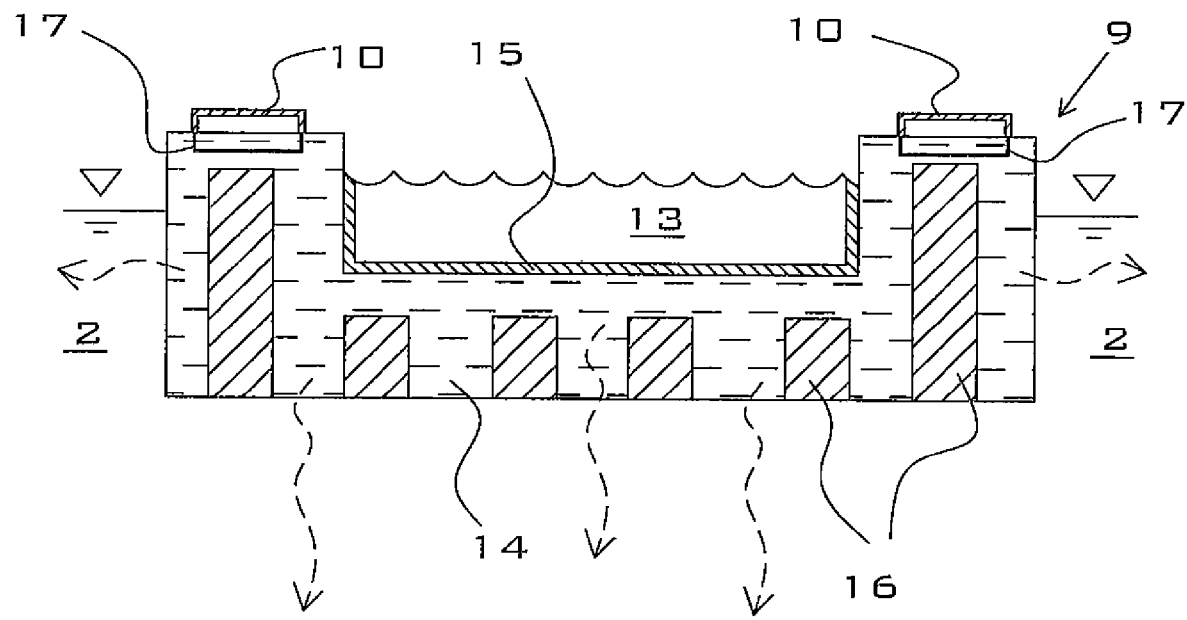
FIG. 3 is a schematic cross-section view of a first embodiment of a treatment channel.

FIG. 3 is a schematic cross-section view of a first embodiment of a treatment channel 9. In this embodiment, walkways 10 are positioned on either side of the treatment channel 9. This figure also shows the permeable matrix 14, the periphyton layer 15, the treatment water 13, and the flotation units 16. The treatment channel 9 is shown floating in stratified water body 2. The dashed arrows in FIG. 3 represent the portion of treatment water 13 that percolates through the periphyton layer 15 and the permeable matrix 14. Note that water may percolate downward through the bottom of the treatment channel and also horizontally through the sides of the treatment channel. The periphyton layer 15 grows naturally on the bottom and sides of each treatment channel under typical ambient pond conditions.

Periphyton is typically a mixture of algae, cyanobacteria, bacteria, and their residue and detritus. Because algae require sunlight to survive, the periphyton layer 15 will typically be restricted to the outer surfaces of the permeable matrix 14. Bacterial biofilms do not require sunlight and are well suited for colonization within the interior zones of the permeable matrix 14; therefore, as water flows through the periphyton layer 15 and then through the permeable matrix 14, nutrients and other contaminants are mechanically filtered and biologically converted by algae and bacteria. The sides and bottom of the channel may optionally be constructed with a removable liner (not shown) to facilitate removal and harvest of periphyton, if desired.

The permeable matrix 14 is preferably comprised of non-woven polymer fibers. One acceptable commercially available matrix product is comprised of polyester fibers that are intertwined to form a randomly oriented web or "blanket" with a standard thickness and width. One manufacturer of suitable matrix material is Americo Manufacturing Company, Inc. of Acworth, Ga. In one preferred embodiment, the matrix is comprised of 200-denier polyester fibers that are intertwined to form a blanket approximately 1¾ inch thick by 56 inches wide. The matrix is produced in a continuous strip and cut to lengths of approximately 90 feet for shipping. The nominal weight of the blanket is 41 ounces per square yard. The nominal weight of the polyester fibers within the blanket is 26 ounces per square yard. A water-based latex binder is preferably baked onto the fibers to increase the stiffness and durability of the blanket. Relatively thick blocks of matrix material may be formed by stacking and bonding multiple layers of the matrix blanket to the desired thickness. Suitable bonding means include injecting cure-in-place polyurethane foam (either open cell or closed cell) to the stacked layers, spraying hot melt glue between the layers prior to stacking, and stitching the stacked layers together with polymer cords.

The characteristics of the matrix can be adjusted by varying the construction materials and manufacturing process. For example, the diameter of the fibers may be varied from approximately 6 to 300 denier. Coarse fibers result in a relatively stiff matrix with relatively small surface area for colonizing microbes, and fine fibers result in a relatively flexible matrix with a relatively large surface area for colonizing microbes. The latex binder can be applied relatively lightly or relatively heavily to vary the durability and weight of the matrix, and dye or pigment can be added to the binder to produce a specific color of matrix. The latex-coated fibers provide an excellent growth substrate for colonization by beneficial microbes. The thickness of the blanket can be adjusted from approximately ¼-inch to two inches using current manufacturing techniques. It is anticipated that thicker blankets will be produced in the future, and these thicker blankets (for example, three to 12 inches) will be used when they become available.

A second acceptable material for manufacturing nonwoven matrix is post-consumer carpet (i.e., recycled scrap carpet) that has been chopped and/or shredded to produce fibers made from polypropylene, polyethylene and/or nylon. The fibers are then compressed to the desired bulk density and optionally treated with a binder, in a process similar to that described for the polyester fiber matrix above.

The hydraulic conductivity of the permeable matrix preferably ranges from about 0.1 to 10.0 feet/second. The thickness of the permeable matrix along the bottom and sides of the treatment channel preferably ranges from about four to 36 inches. Internal buoyancy is integrated within the permeable matrix 14 by injecting uncured liquid polyurethane resin under pressure into the matrix 14. The polyurethane resin then expands and cures in place within the matrix, thereby forming flotation units 16. The injection pressure, resin temperature, and injection shot volume of the foam injection machine are preferably preset so as to provide the desired final volume of cured buoyant foam. The foam can be installed so as to provide a continuous volume throughout the matrix, or, alternately, it can be installed so as to provide individual buoyant sections of foam within the matrix that are separated by non-foamed zones of matrix.

FIG. 3 shows flotation units 16 that have been formed by injecting resin into the bottom side of the permeable matrix 14; however, the resin may optionally be injected from the top, sides, or bottom of the matrix, or from a combination of these surfaces. In one preferred embodiment, the matrix 14 is constructed so as to have a thickness of approximately 24 inches on the sidewall of the channel and eight inches beneath the channel. Uncured foam resin having a nominal cured density of 2.5 pounds per cubic foot (pcf) is injected into the bottom of the matrix and penetrates to the top surface of the matrix. For the eight-inch thick portion of the matrix 11, a four-second shot of uncured foam is injected with a pressure of approximately 70 pounds per square inch, resulting in a cured mass of foam approximately spherical in shape, having a diameter of approximately eight inches. The sphere has a density of approximately 5.8 pcf, consisting of approximately 2.5 pcf polyurethane foam that is reinforced with matrix having a density of approximately 3.3 pcf. For the 24-inch thick portion of the matrix 14, the resin is injected via a 12-inch long needle that is pushed into the matrix from the bottom edge. The needle is slowly withdrawn as the foam is injected during an eight-second shot, resulting in a cylindrical cured mass of foam having a diameter of about eight inches and a height of about 16 inches.

The density of the polyurethane foam can be adjusted by varying the chemical formula of the resin, or by varying the application parameters such as temperature and pressure. Practical foam densities for the flotation units 16 range from about 1.0 to 25.0 pcf. The lighter foams are desirable where high buoyancy and low cost are important—for example, for decorative water garden islands. The heavier density foams are preferable where high strength and durability are important—for example, where the FTS may be subjected to boat impacts or heavy wave action. The foamed zones of the matrix may be optionally coated with a spray-on polyurethane outer covering to increase durability. Alternately, self-skinning foams that cure with a tough outer cover may be used to provide extra durability for the flotation units 16.

The walkways 10 are preferably comprised of molded, fiberglass-reinforced plastic grating. One acceptable commercially available product is GRIDMARK™ grating manufactured by American Grating LLC of Henderson, Nev. This grading is available in dimensions of ten feet long by three feet wide by 1.5 inches tall and is coated with a non-slip surface. The walkways may also be comprised of treated lumber or polymer-resin boards. The walkways 10 are preferably attached to the matrix 14 by steel cables, polymer cords or webbing 17 that either pass around or through the matrix and walkways.

Figure 4:
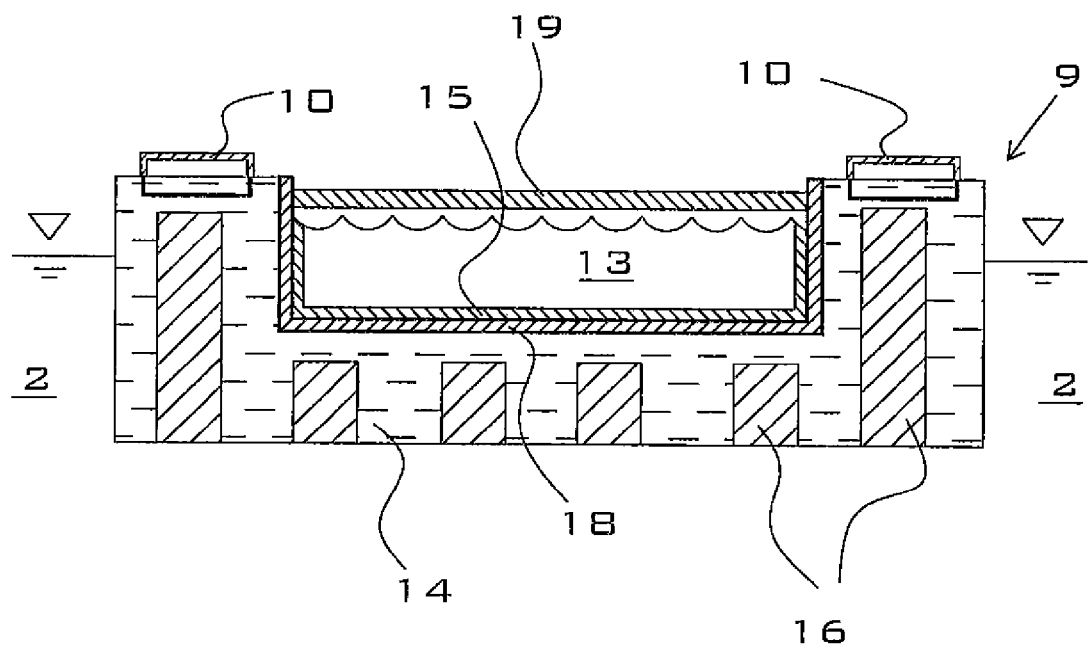
FIG. 4 is a schematic cross-section view of a second embodiment of a treatment channel incorporating an impermeable channel liner and top cover.

FIG. 4 is a schematic cross-section view of a second embodiment of a treatment channel 9, which incorporates an optional impermeable channel liner 18 and an optional top cover 19. With this embodiment, percolation of the treatment water 13 through the permeable matrix 14 is prevented. This embodiment is preferred for applications in which it is desirable to maximize the time that the treatment water remains within the channel for treatment or for applications in which the channel contains in-stream filters.

The impermeable channel liner 18 may be comprised of materials that are suitable for use as pond liners—for example, polyethylene, polyvinyl chloride, EDPM rubber, or polypropylene sheeting. The impermeable liner material is preferably resistant to degradation by ultraviolet sunlight and is resistant to punctures and tears. The top cover 19 may be comprised of gas-impermeable polymer sheeting to prevent the treatment water 13 from coming into contact with atmospheric oxygen (exclusion of oxygen is desirable for some microbial processes such as denitrification), or it may be comprised of opaque fabric or polymer sheeting that excludes sunlight and thereby prevents the growth of algae and plants while allowing the growth of beneficial bacteria (which is desirable for situations in which plugging of the matrix by periphyton may be a problem), or it may be made of polymer or natural-fiber netting that excludes predatory birds, thereby providing secure habitat for fish and wildlife residing within the treatment water 13.

Figure 5:
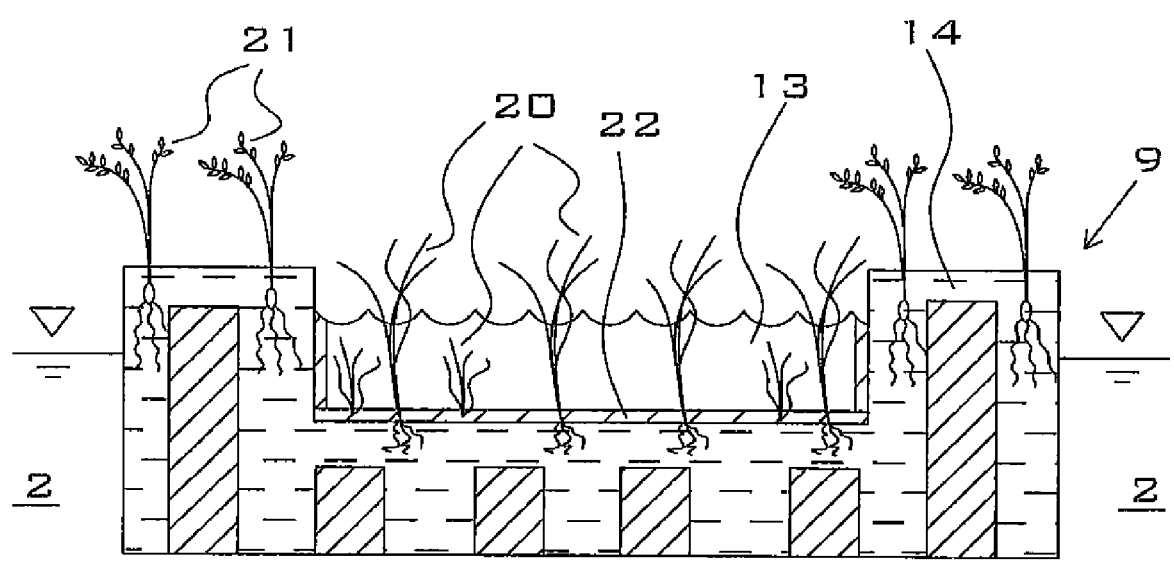
FIG. 5 is a schematic cross-section view of a third embodiment of a treatment channel incorporating aquatic, riparian and/or terrestrial plants.

FIG. 5 is a schematic cross section view of a third embodiment of a treatment channel 9, which comprises aquatic plants 20 and riparian or terrestrial plants 21. (As shown in this figure, the plants may be located within the treatment channel itself or in the matrix 14 on either side of the treatment channel.) The plants may be used to increase the removal rate of excess nutrients from the treatment water 13 via phytoextraction. The plants 20, 21 may also contribute to the aesthetic appeal of the structure. Wetland sod 22 or bedding plants or plugs may be used to grow the aquatic plants 20. Wetland sod is typically comprised of aquatic and riparian plants that are rooted into coir or jute blankets. One supplier of wetland sod is Great Bear Restoration of Hamilton, Mont. If wetland sod is utilized, it may be attached to the treatment channel bottom. Grass sod, bedding plants and/or seeds may be used to grow the riparian or terrestrial plants 21. The bedding plants or plugs and seeds may optionally be inserted into precut holes (not shown) within the permeable matrix 14. The grass sod is laid over the top surfaces of the permeable matrix 14 that are above waterline. The sod (wetland or grass) may be attached to the permeable matrix 14 with landscaping pins (not shown), which will hold the sod in place until it becomes attached by roots growing into the permeable matrix 14. Optional growth medium (not shown) such as peat, bedding soil or rock wool, or combinations of these materials, may be used to fill the holes prior to planting.

FIG. 6 is a schematic top view of a fourth embodiment of a treatment channel 9 that comprises three-dimensional baffles 23. These baffles 23 are used to produce longer flow paths for treatment water flowing though the treatment channel 9, thereby increasing the exposure of the treatment water 13 to periphyton growing on the wetted surfaces of the treatment channel that are exposed to sunlight and bacterial biofilms growing on the surfaces of the fibers within the permeable matrix 14. The baffles are preferably comprised of permeable matrix material similar to the permeable matrix 14, which allows a portion of the treatment water to flow horizontally through the baffles 23 and the remainder of the water to flow around the baffles 23. The permeable baffles preferably have a hydraulic conductivity ranging from about 0.1 to 10.0 feet/second and a thickness ranging from about 0.5 to 4.0 feet in the direction of flow. The baffles may be attached to the sides and bottom of the treatment channel 9 with closed cell polyurethane foam, open cell polyurethane foam, or hot melt glue.

Referring to FIG. 6, water flow patterns around and through the permeable baffles are shown by dashed arrows in the figure. The portion of water that flows through the baffles 23 is exposed to periphyton on the baffle surfaces and also to microbial biofilms growing within the baffles, thereby resulting in additional removal of nutrients and other contaminants from the treatment water via a combination of mechanical and biological filtration. Also shown in this figure are optional walkways 10. These walkways are useful for providing access to measure water quality parameters such as dissolved oxygen and temperature and to check for plugging or other problems.

Figure 6A:
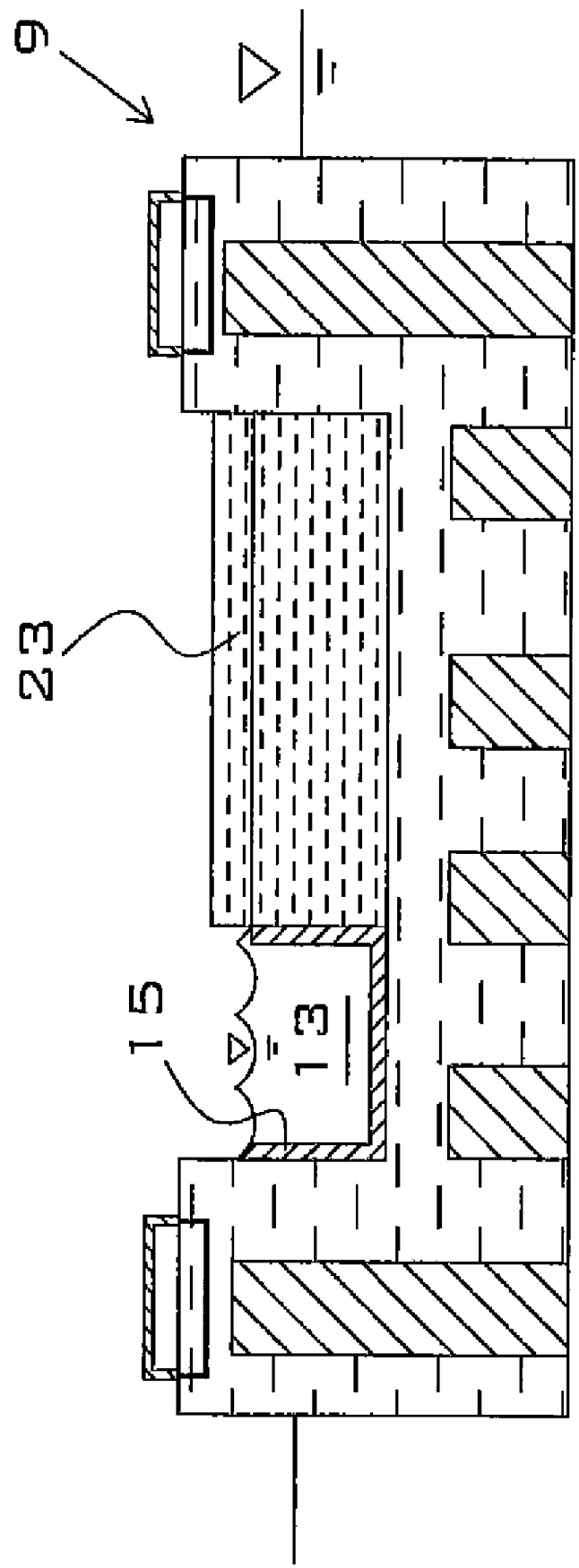
FIG. 6A is a schematic cross-section view of the treatment channel shown in FIG. 6.

FIG. 6A is a schematic cross-section view of the treatment channel 9 and one of the baffles shown in FIG. 6. As shown in this figure, the baffle 23 extends across a portion of the channel width and also above the waterline within the channel. A periphyton layer 15 grows along all of the wetted surfaces that are exposed to sunlight.

Figure 7A:
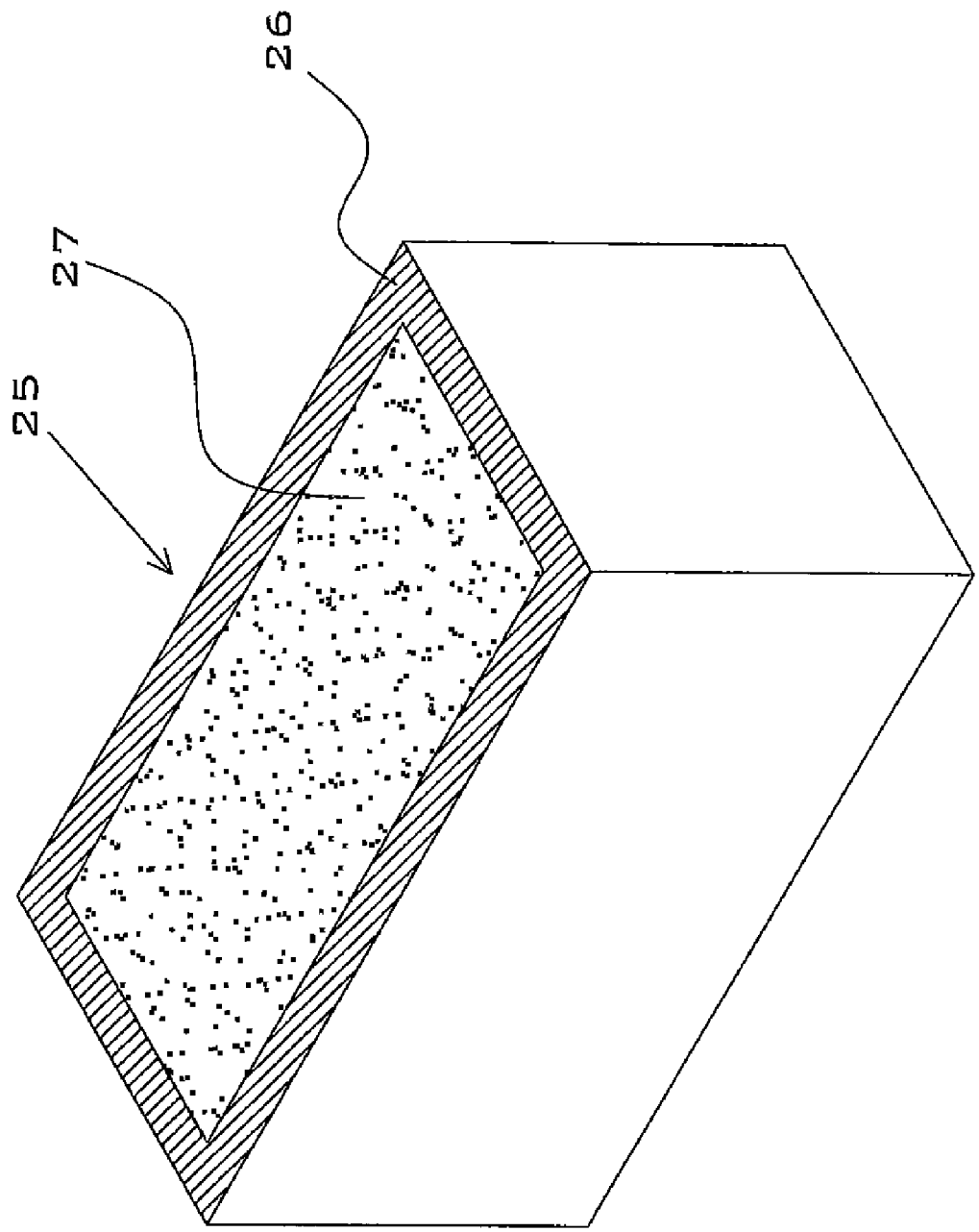
FIG. 7A is a perspective view of the absorbent channel filter shown in FIG. 7.

FIG. 7 is a schematic top view of a fifth embodiment of a treatment channel 9 that comprises two types of optional channel filters, namely, a permeable matrix channel filter 24 and an absorbent channel filter 25. The filters are preferably used in combination with an impermeable channel liner (not shown in FIG. 7) that covers the channel sides and bottom (see FIG. 4), thereby resulting in the entire water flow of the treatment channel 9 passing through the channel filters 24 and 25 rather than having a portion of the water passing around the filters 24 and 25 and/or through the sides and bottom of the treatment channel. The filters may be attached to the sides and bottom of the treatment channel 9 with closed cell polyurethane foam, open cell polyurethane foam, or hot melt glue. The two types of filters may optionally be deployed together sequentially, as shown in the figure, or alone. The permeable matrix channel filter 24 is preferably comprised of permeable matrix material that is similar or identical to the permeable matrix material 14 that has been described previously in connection with FIGS. 3 and 4. The absorbent channel filter 25 is described in conjunction with FIG. 7A.

FIG. 7A is a perspective view of an absorbent channel filter 25 that comprises an outer support frame 26 and an absorbent fill material 27. The outer support frame 26 is preferably comprised of sheets of permeable matrix material that is similar or identical to the permeable matrix material 14 that has been described previously in connection with FIGS. 3 and 4. These sheets are joined with either closed cell polyurethane foam, open cell polyurethane foam, or hot melt glue.

In a first embodiment, the absorbent fill material is comprised of polymer sponge material that has been manufactured so as to trap organic particles and dissolved metals. Examples of commercially available sponge materials that are suitable for this application include the SMART SPONGE® products from AbTech Industries, Inc. of Scottsdale, Ariz. and the FORAGER™ Sponge products from Dynaphore, Inc. of Richmond, Va. In a second embodiment, the absorbent fill material is comprised of granular activated carbon, which is known to have the ability to trap numerous organic and inorganic contaminants. Optionally, slow-release pH modifiers such as granular calcium carbonate may be added to the absorbent fill material. The outer support frame 26 prevents the pieces of absorbent material 27 from being swept away by the moving treatment water and facilitates the removal and replacement of the absorbent material 27 when it becomes saturated with trapped contaminants. The frame 26 may be attached to the sides and floor of the treatment channel 9 with closed cell polyurethane foam, open cell polyurethane foam, or hot melt glue.

Although not shown in the drawing, the absorbent filter 25 may include a lid that helps encapsulate the absorbent fill material 27. The lid may be comprised of a sheet of permeable matrix material that is similar or identical to the permeable matrix material 14 that has been described previously in connection with FIGS. 3 and 4.

Figure 8:
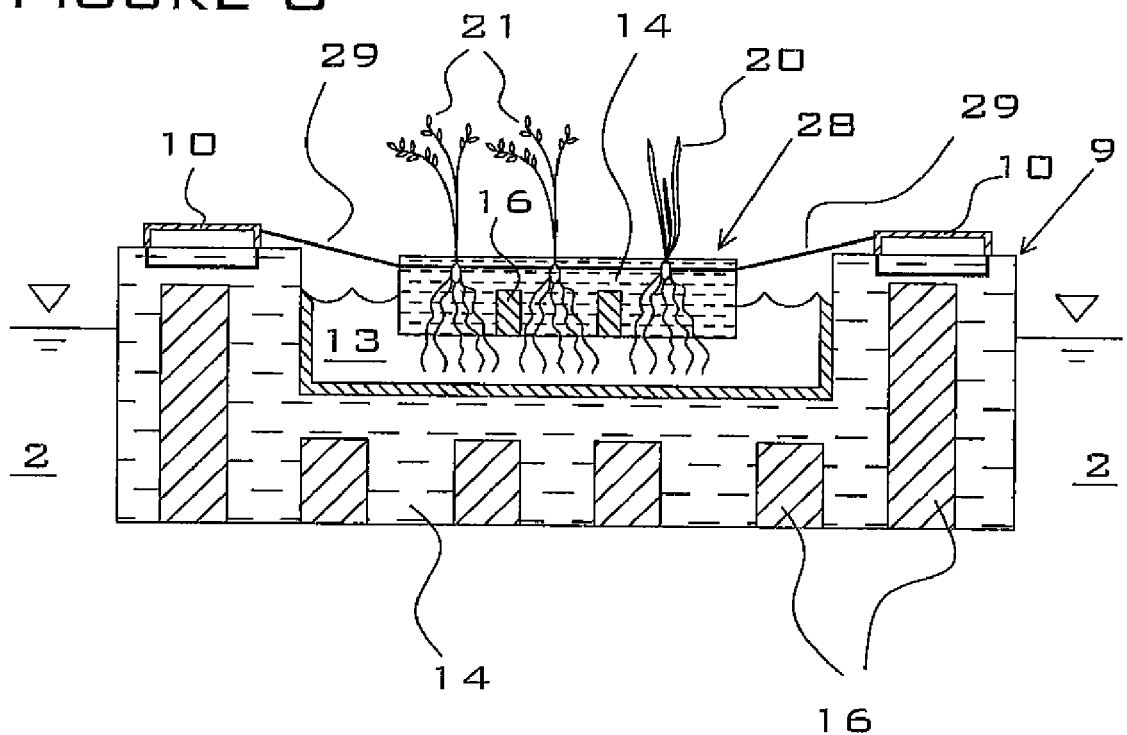
FIG. 8 is a schematic cross-section side view of a sixth embodiment of a treatment channel that comprises an in-stream floating treatment island.

FIG. 8 is a schematic cross-section side view of a sixth embodiment of a treatment channel 9 that comprises an in-stream floating treatment island 28. The floating treatment island 28 comprises permeable matrix 14, flotation units 16, tethering cables 29, optional aquatic plants 20, and optional terrestrial or riparian plants 21. Tethering cables 29 are used to maintain the floating treatment island at a fixed position within the treatment channel 9. The tethering cables are preferably constructed from polymer rope or webbing or stainless steel wire rope. The tethering cables 29 preferably run through the permeable matrix 14 of the floating island 28 and are attached to the walkways 10.

One beneficial purpose of the floating island 28 is to enhance the removal of nutrients and other contaminants from the treatment water 13. A first portion of the treatment water 13 within the treatment channel 9 flows through the permeable interior region of floating treatment island 28, where biofilms growing on the internal fibers of the permeable matrix 14 and roots from the plants 20 and 21 growing within the permeable matrix 14 remove a portion of the nutrients and other contaminants from the treatment water 13. A second portion of the treatment water 13 flows around and underneath the floating island 28, where the exposed roots of the plants 20 and 21 remove another portion of the nutrients and other contaminants from the treatment water 13. A second beneficial purpose of the floating island 28 is to provide shade and protective cover for fish and other wildlife that use the treatment channel 9 for living and/or feeding habitat.

Figure 9:
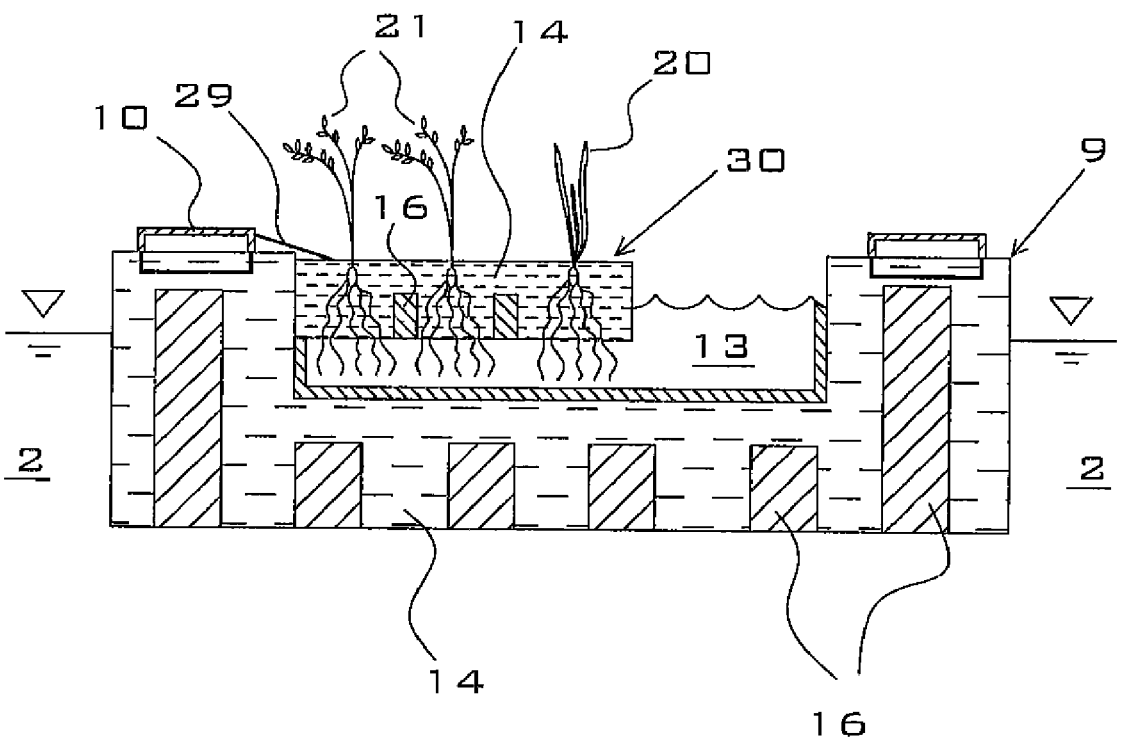
FIG. 9 is a schematic cross-section side view of a seventh embodiment of a treatment channel that comprises an overhanging treatment bank.

FIG. 9 is a schematic cross-section side view of a seventh embodiment of a treatment channel 9, which comprises an overhanging treatment bank 30. The overhanging treatment bank is similar in construction and operation to the floating treatment island described in reference to FIG. 8 above. It comprises permeable matrix 14, flotation units 16, tethering cables 29, optional aquatic plants 20, and optional terrestrial or riparian plants 21. Tethering cables 29 are used to maintain the overhanging treatment bank against one side of the treatment channel 9 at a fixed position and are preferably attached to the walkway 10.

One beneficial purpose of the overhanging treatment bank 30 is to enhance the removal of nutrients and other contaminants from the treatment water 13. A first portion of the treatment water 13 within treatment channel 9 flows through the permeable interior region of overhanging treatment bank 30, where biofilms growing on the internal fibers of the permeable matrix 14 and roots from the plants 20 and 21 growing within the permeable matrix 14 remove a portion of the nutrients and other contaminants from the treatment water 13. A second portion of the treatment water 13 flows around and underneath the overhanging treatment bank 30, where the exposed roots of the plants 20 and 21 remove another portion of the nutrients and other contaminants from the treatment water 13. A second beneficial purpose of the overhanging treatment bank 30 is to provide shade and protective cover for fish and other wildlife that use the treatment channel 9 for living and/or feeding habitat.

FIG. 10 and FIG. 10A are a schematic top view and a schematic cross-section side view, respectively, of an eighth embodiment of a treatment channel 9 that incorporates a side exit channel 31. The side exit channel 31 is constructed by lowering the elevation of a side wall of the treatment channel 9 so that a portion of the treatment water 13 escapes from the treatment channel 9, as shown by the curved flow arrow in FIG. 10. Although only one side exit channel is shown for clarity, a treatment channel 9 may contain a plurality of side exit channels 31. The purpose of the side exit channel 31 is to provide a relatively shallow stream section compared to the stream depth in the treatment channel 9, as shown in FIG. 10A. The shallow water within the side exit channel 31 provides an attractive feeding habitat for shorebirds 32 such as sandpipers, which feed on scuds and insects that live in the periphyton layer 15 that coats the bottom of the exit side channel 31. Optionally, the flow rate from the circulation pump can be periodically reduced so that the water flow in the side exit channel 31 is reduced and/or stopped. This periodic cycling of the water level in the exit side channel may be particularly attractive to species of shorebirds that naturally feed along the tide line or wave line of beaches.

Figure 11:
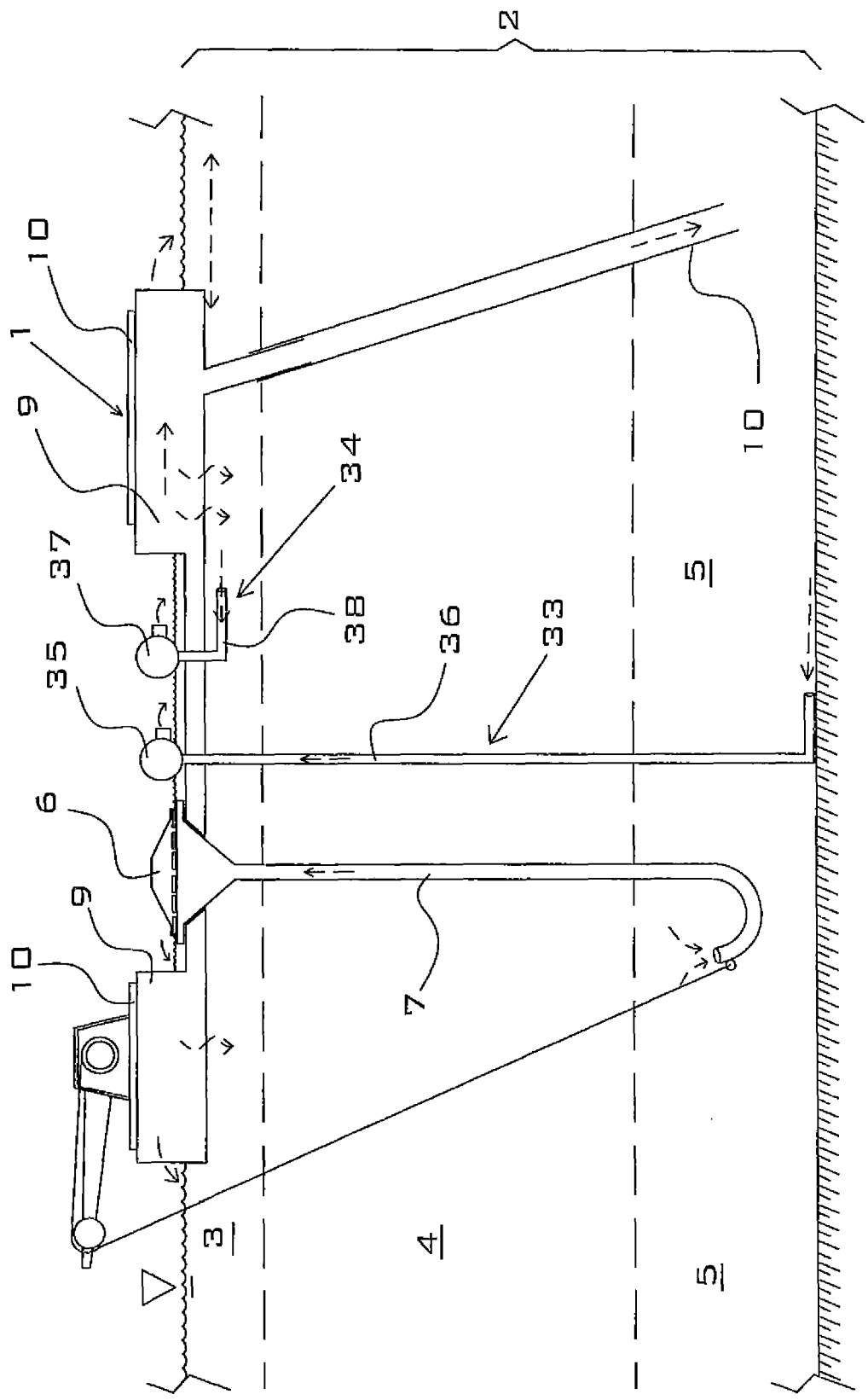
FIG. 11 is a schematic side view of the present invention with an optional sludge input system and an optional surface water input system.

FIG. 11 is a schematic side view of the present invention with an optional sludge input system and an optional surface water input system. The sludge input system 33 comprises a sludge pump 35 and a sludge inlet pipe or hose 36. The inlet of sludge pipe or hose 36 is set at the bottom of the water body 2. The purpose of the sludge input system 33 is to provide bottom sludge for mixing with the treatment water prior to treatment. Because sludge can be relatively rich in organic carbon, it can be used to provide carbon used for microbial processes such as denitrification, which requires a carbon source in order to convert nitrate to nitrogen gas. The sludge input system 33 can also be used to treat sludge that is contaminated with metals or other contaminants, in cases where such treatment is desired.

The surface water input system 34 comprises a surface water pump 37 and a surface water inlet hose or pipe 38 with an inlet end within the surface layer 3 of the water body. The purpose of the surface water input system 34 is to provide surface water for mixing with the treatment water prior to treatment. Because surface water can be relatively high in dissolved oxygen and is typically warmer than water from the intermediate zone 4 or the deep zone 5, adding surface water to deeper waters prior to treatment may increase the reaction rate of certain aerobic microbial processes such as autotrophic nitrification or heterotrophic conversion of organic carbon.

In one hypothetical example, deep-zone water contains high concentrations of nutrients and is at a relatively low temperature, while shallow-zone water is relatively nutrient-free and warm. By mixing the waters form the two zones prior to treatment, the biofilms in the permeable matrix 14 are exposed to moderate concentrations of nutrients at moderate temperatures. Because the nutrient removal rate by biofilms is proportional to temperature, the removal rate of the blended water is greater than that of the cold water. In a second hypothetical example, the deep zone contains high concentrations of ammonia and phosphate but a low concentration of oxygen, while the shallow zone (or surface layer) contains a relatively high concentration of dissolved oxygen. By blending the waters from the two zones, the biofilms are exposed to nutrients plus oxygen, and the oxygen allows aerobic microbes to convert nutrients to biofilm and then to periphyton at a faster rate compared to anaerobic film conversation.

Figure 12:
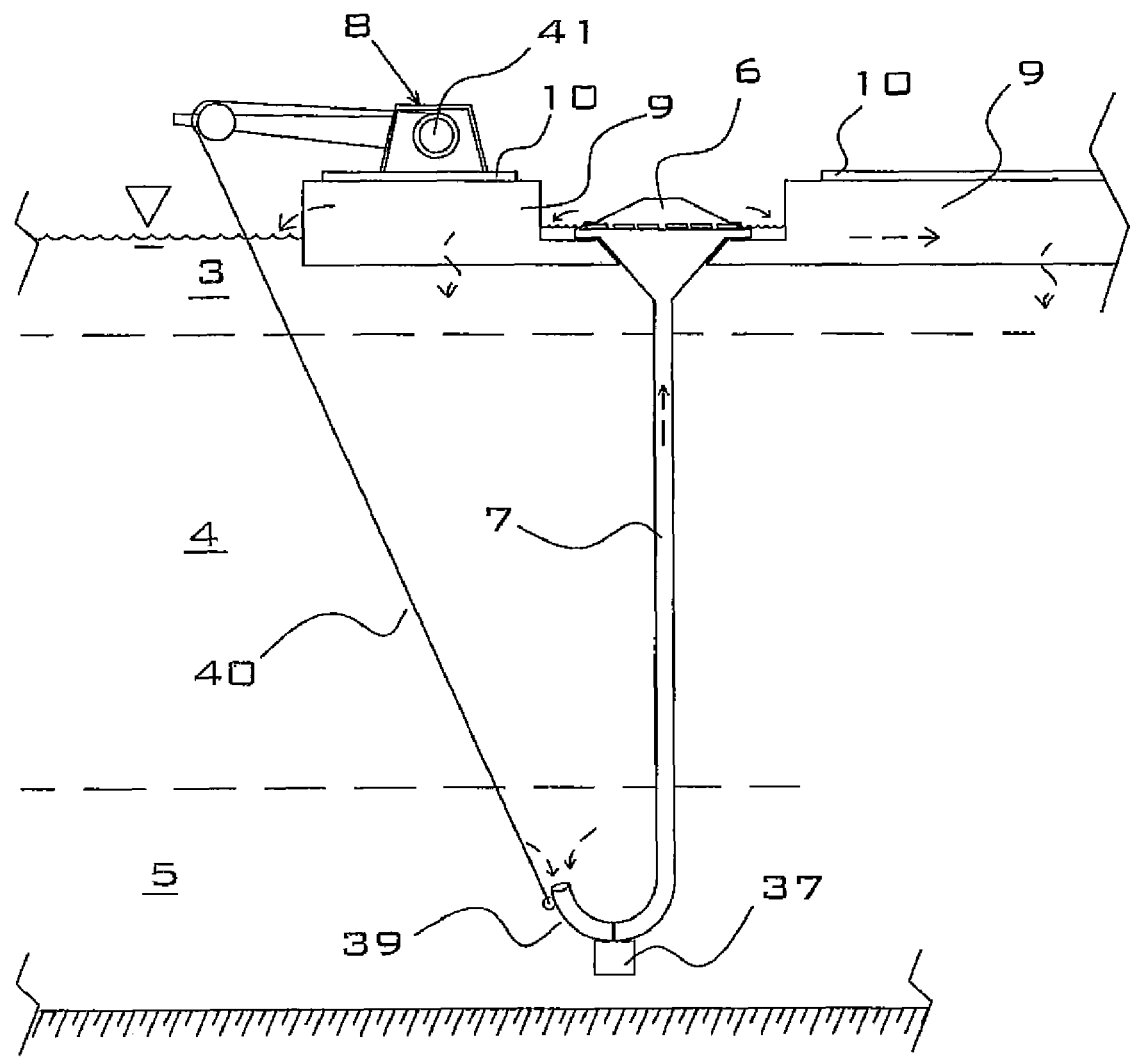
FIG. 12 is a schematic side view of a first embodiment of the adjustable-depth inlet water system shown in FIG. 1.

FIGS. 12 and 12A are schematic side views of a first embodiment of the adjustable-depth inlet water system previously shown in FIG. 1. As shown in FIG. 12, the inlet end 39 of the inlet hose or pipe 7 is connected to the terminal end of a cable or rope 40 that is spooled onto a winch 41, which is a component of the inlet hose depth adjuster 8. For this embodiment, the inlet hose or pipe 7 is manufactured so as to have longitudinal flexibility combined with circumferential stiffness, which allows it to bend without collapsing. In FIG. 12, the inlet end 39 of the inlet hose or pipe 7 is shown at approximately maximum depth. When the winch 41 is turned clockwise by hand or motor (not shown), the cable, rope or webbing 40 is spooled onto the winch 41, thereby raising the inlet end 39 of inlet hose 7 to a shallower depth, as shown in FIG. 12A. By this means, the inlet end 39 may be set at any desired depth depending on site conditions.

An optional weight 42 may be installed onto the inlet hose 7, if required, to keep it from floating. One suitable type of hose material for this embodiment is PVC blower/vacuum hose that is reinforced with a molded-in spiral steel wire. An example of a commercially available hose of this type is McMaster-Carr part #5666K48. The weight 42 is preferably comprised of concrete or metal. The weight 42 is preferably connected to the inlet hose or pipe 7 by a band or strap comprised of nylon or steel.

Figure 13:
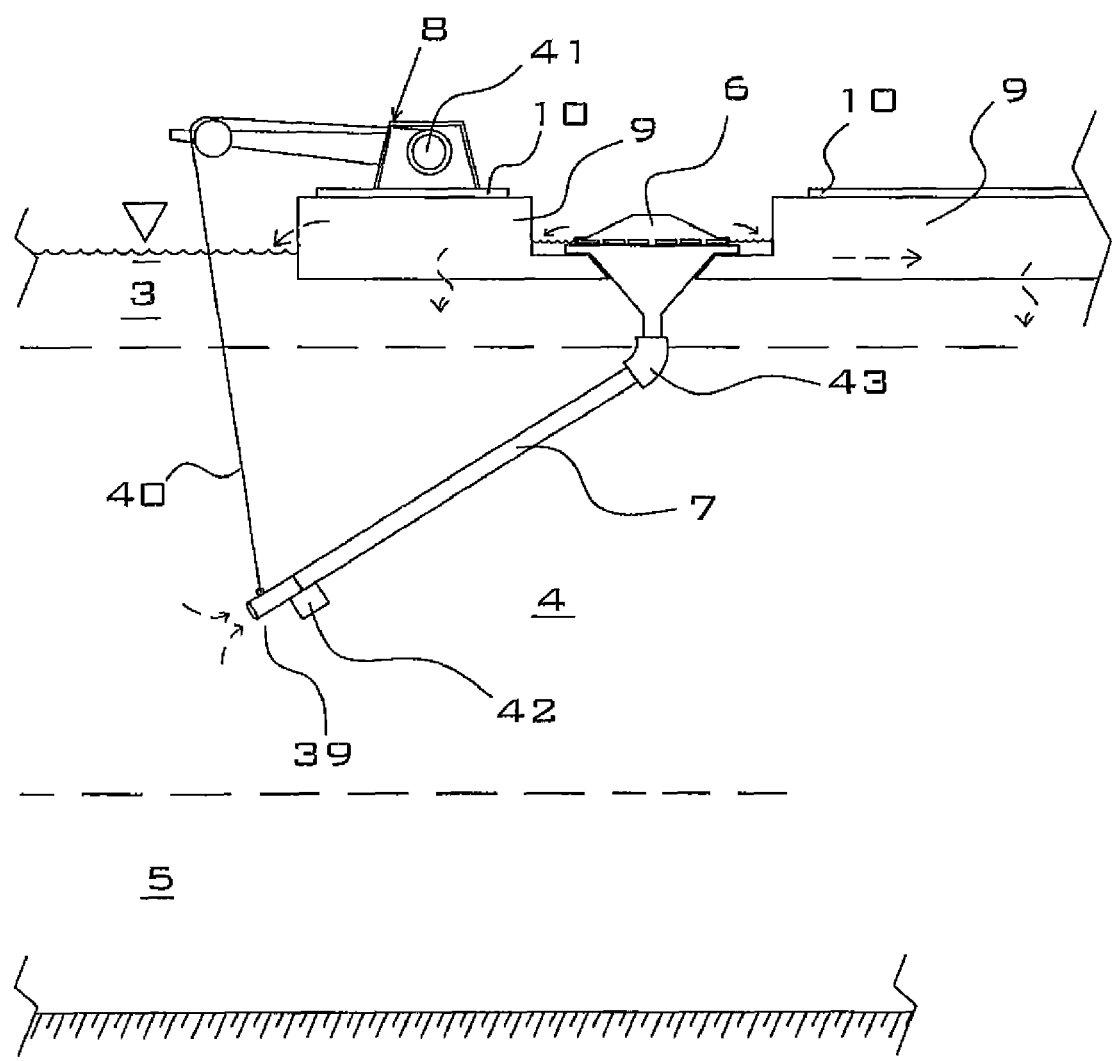
FIG. 13 is a schematic side view of a second embodiment of the adjustable-depth inlet water system.

FIG. 13 is a schematic side view of a second embodiment of an adjustable-depth inlet water system. As shown in this embodiment, the inlet hose or pipe 7 is fitted with a flexible joint 43. When the cable or rope 40 is retracted by turning the winch 41 clockwise, the inlet end 39 of the inlet hose or pipe 7 is raised to a shallower depth. For this embodiment, rigid pipe is the preferred material for the inlet hose or pipe 7. One acceptable material for the inlet hose or pipe 7 of this embodiment is Schedule 40 PVC pressure pipe. An optional weight 42 may be connected to inlet hose or pipe 7, as shown, to prevent it from floating. The flexible joint 43 is preferably comprised of rubber hose or steel-reinforced PVC hose.

Figure 14:
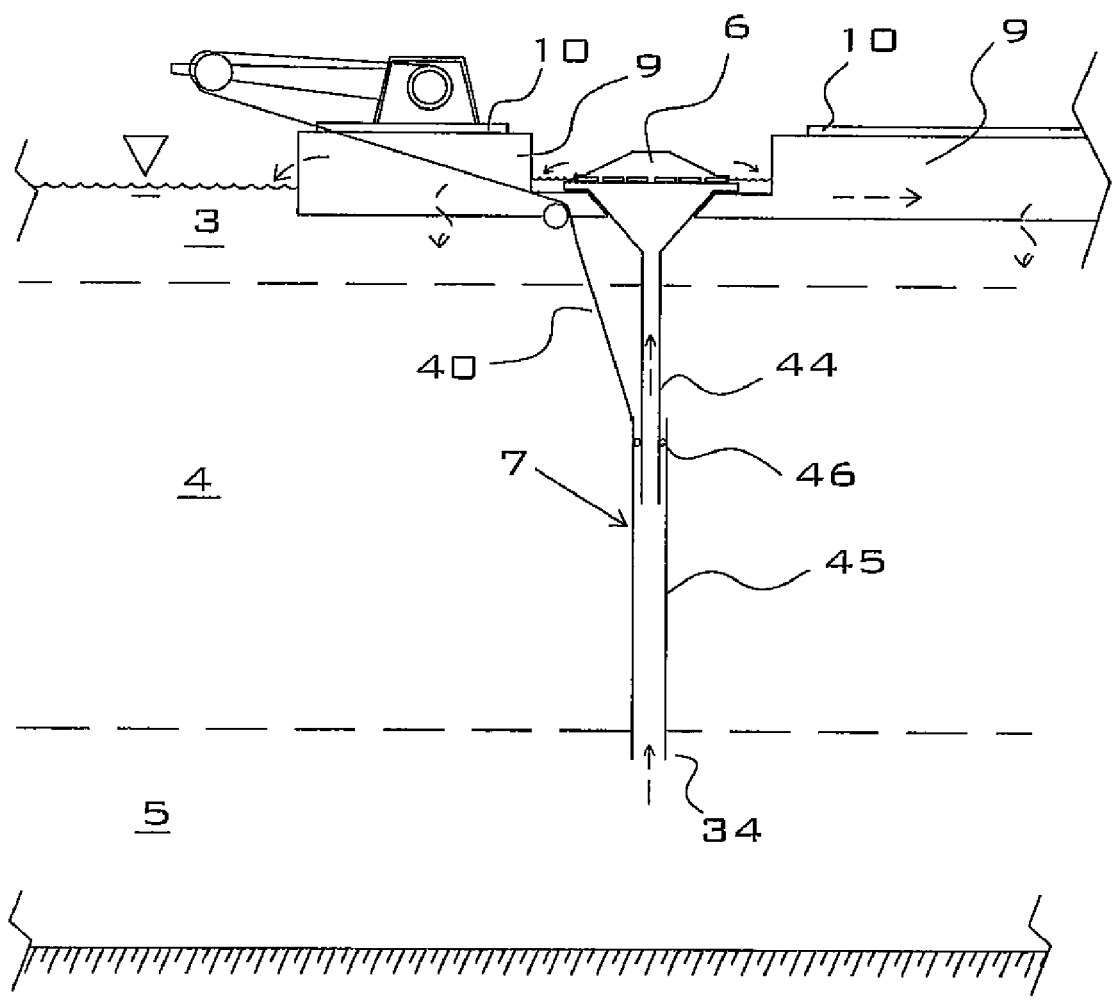
FIG. 14 is a schematic side view of a third embodiment of the adjustable-depth inlet water system.

FIG. 14 is a schematic side view of a third embodiment of an adjustable-depth inlet water system. In this embodiment, the inlet hose or pipe 7 is comprised of an inner pipe 44, a telescoping outer pipe 45, and a fluid seal 46. When the cable or rope 40 is retracted, the telescoping outer pipe 45 moves vertically upward around the inner pipe 44, thereby raising the inlet end 39 of the inlet hose or pipe 7 to a shallower depth.

Figure 15:
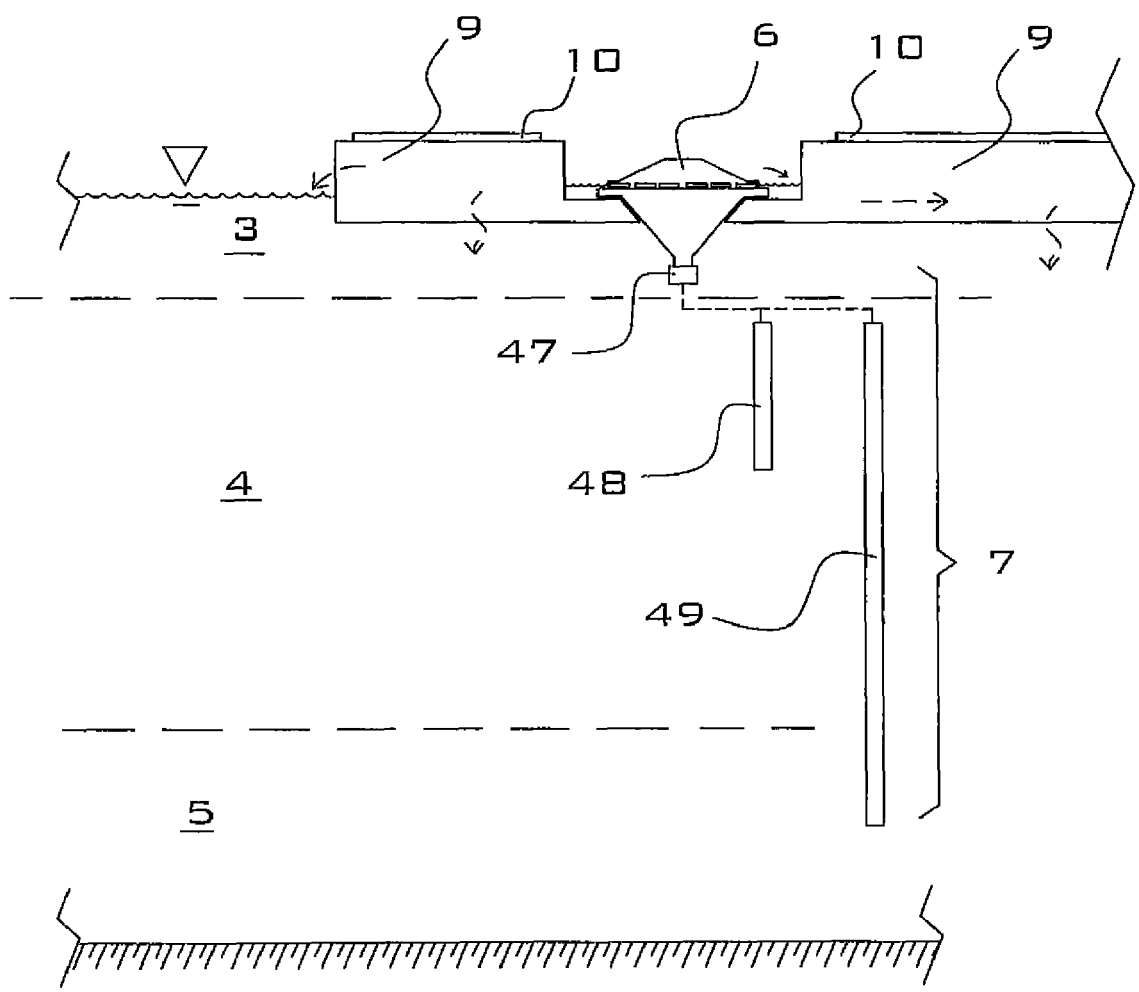
FIG. 15 is a schematic side view of a fourth embodiment of the adjustable-depth inlet water system.

FIG. 15 is a schematic side view of a fourth embodiment of the adjustable-depth inlet water system. In this embodiment, the inlet hose or pipe 7 comprises a union 47, a short extension pipe 48, and a long extension pipe 49. The inlet depth is adjusted by manually installing the long extension pipe 49 onto the union 47 for maximum inlet depth, by manually installing the short extension pipe 48 onto the union 47 for intermediate inlet depth, or by installing no pipes onto the union 47 for shallow inlet depth (as shown in the figure).

Figure 16:
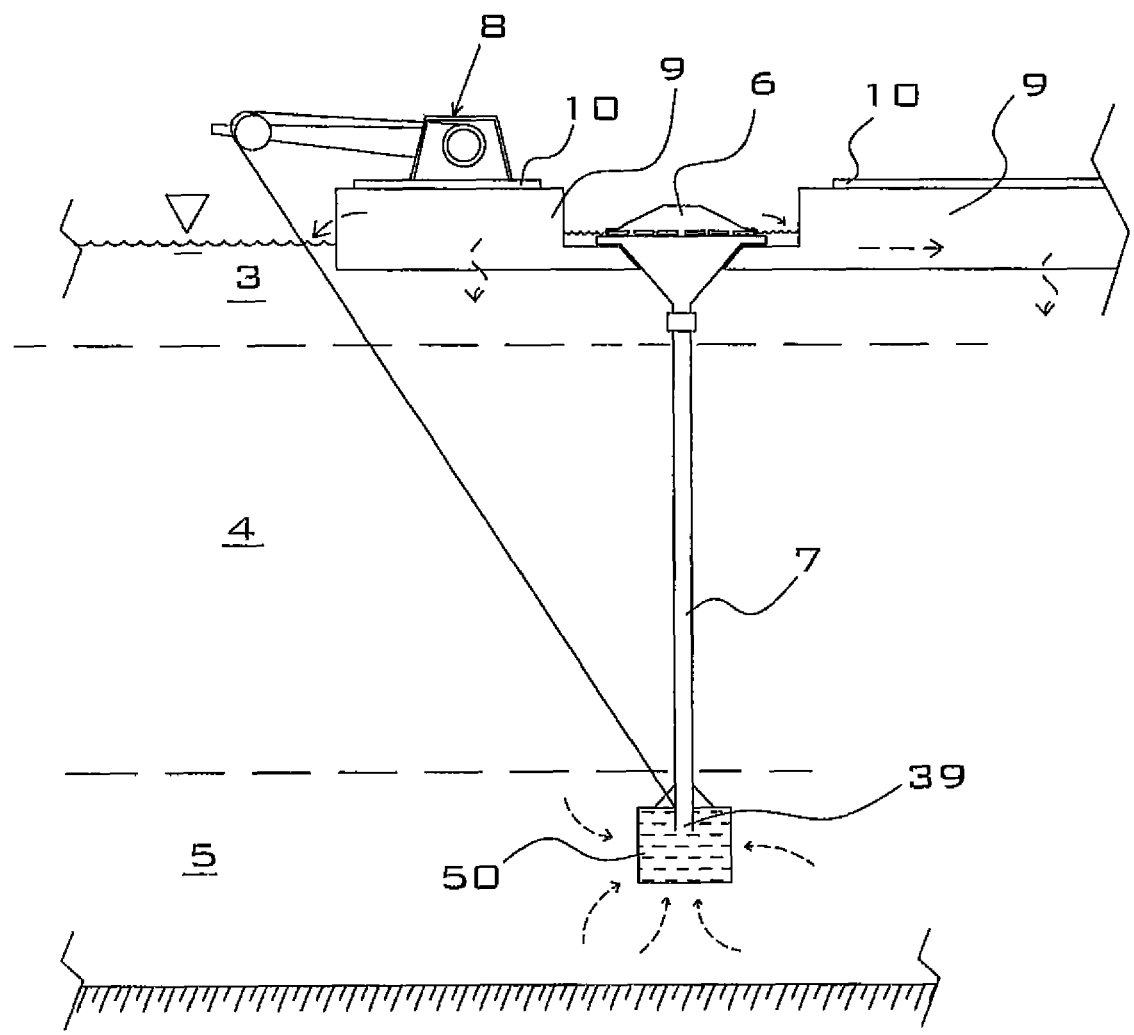
FIG. 16 is a schematic side view of the adjustable-depth inlet water system of FIG. 12 with an optional inlet filter.

FIG. 16 is a schematic side view of an adjustable-depth inlet water system comprising an optional inlet filter 50 that surrounds the inlet end 39 of inlet hose 7. The dashed arrows in the drawing represent the flow of untreated water into the inlet filter 50. The inlet filter 50 is preferably comprised of permeable matrix material that is similar or identical to the permeable matrix material 14 that comprises the treatment channel 9 shown in FIGS. 3 and 4. The inlet filter 50 may be manufactured in any prismatic or freeform shape and is preferably attached to the inlet hose or pipe 7 by nylon webbing straps (not shown).

A first purpose of the inlet filter 50 is to provide initial mechanical filtration of solids (e.g., leaves and twigs) from the inlet water prior to the inlet water being exposed to the treatment channels 9 shown in FIGS. 3 and 4. A second purpose of the inlet filter 50 is to provide additional microbial colonizing surface for enhanced biological treatment of the inlet water as it passes through the inlet filter 50. The inlet filter 50 may be raised to the surface periodically as required for cleaning or replacement via the inlet hose depth adjuster 8. In preferred embodiments, the volume of the inlet filter 45 may range from about 1 cubic foot to 500 cubic feet, depending on the volumetric flow rate of the inlet water, the level of contamination present in the inlet water, and the amount of pre-filtration that is desired for a particular application. In an alternative embodiment (not shown), matrix material 14 may be packed within the interior of the inlet hose or pipe 7, thereby replacing or assisting the inlet filter 50.

Figure 17:
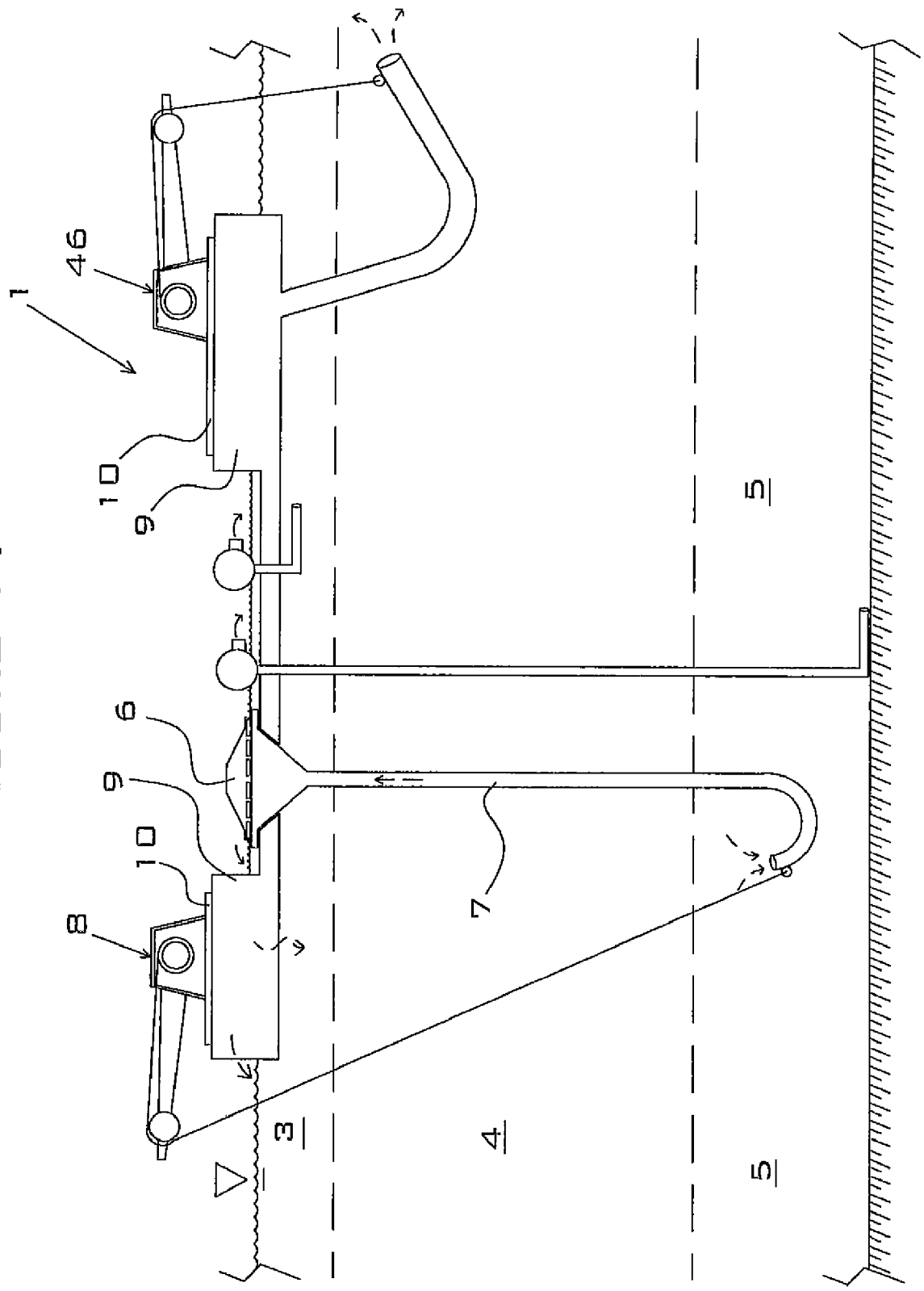
FIG. 17 is a schematic side view of the present invention with an inlet hose depth adjuster and an outlet hose depth adjuster.

The mechanisms shown in FIGS. 12-16 for adjusting the depth of the inlet hose or pipe could be similarly employed to adjust the depth of the outlet pipe. For example, FIG. 17 is a schematic side view of an FTS 1 that comprises an inlet hose depth adjuster 8 and an outlet pipe depth adjuster 51, in which both the inlet hose depth adjuster 8 and the outlet hose depth adjuster 51 are similar to the inlet hose depth adjuster 8 shown previously in FIG. 12.

Although the depth adjustment systems shown in FIGS. 12-16 are illustrated as being manually operated, all of these embodiments could optionally be controlled automatically using computers to monitor water quality at the inlets and outlets and correspondingly set the pipe depth levels for optimal treatment efficacy. Also optionally, dissolved oxygen could be added to the treatment water by injecting air into the inlet hose or pipe 7 (not shown), or air could be added to one or more individual treatment channels using bubblers placed at the upstream ends of the treatment channels (not shown). One example of a commercially available bubbler is the PLACT™ aerator system manufactured by AgriDrain Corporation of Adair, Iowa.

In an alternate embodiment, water circulation through the treatment channels may be provided by gravity power rather than by the circulation pump described in connection with the previous figures. The gravity-flow embodiment may be particularly useful for treatment sites where there exist two nearby bodies of water, and in which the body of water containing the contaminated water has a higher water level than the other body of water.

Figure 18:
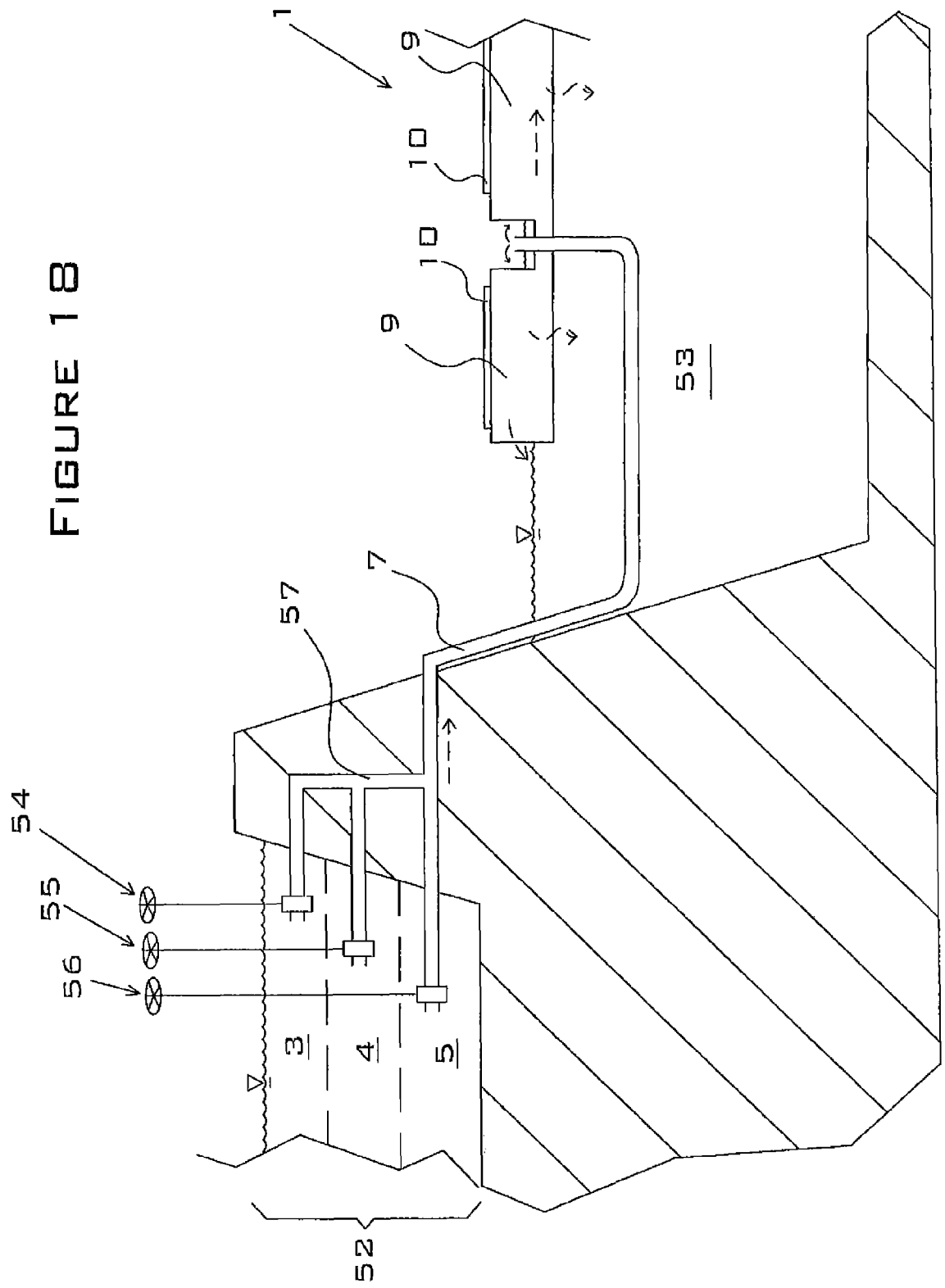
FIG. 18 is a schematic partial side view of an alternative embodiment of the present invention that utilizes gravity flow rather than a pump to circulate treatment water through the system.

FIG. 18 is a schematic partial side view of a gravity-powered floating streambed. In this figure, an upper stratified water body 52 is comprised of a surface layer 3, an intermediate layer 4, and a deep layer 5. The FTS 1 is deployed in the lower water body 53. The system comprises a surface-layer inlet control valve 54, an intermediate-layer inlet control valve 55, and a deep-zone inlet control valve 56. When one or more of the control valves 54, 55, 56 is/are opened, untreated water from the upper stratified water body 52 flows by gravity force through the open valve(s) 54, 55, 56 and then sequentially through the manifold 57, the inlet hose or pipe 7, and the treatment channels 9. After treatment by the FTS 1, the water is discharged into the lower water body 53.

By opening only one of the inlet control valves 54, 55, 56, the operator can select untreated water from the surface layer 3, the intermediate layer 4, or the deep layer 5, depending on specific site conditions. By adjusting the degree of opening of the inlet valves, the operator can control the flow rate of treatment water through the treatment channels 9. For example, contaminated anaerobic water from the deep layer 5 may require more treatment time than contaminated aerobic water from the shallow layer 2; therefore, the water flow rate into the FTS 1 from the deep layer 5 may need to be relatively lower than the water flow rate from the shallow layer 2 in order to achieve adequate biological treatment within the treatment channels 9. For this embodiment, the inlet pipe or hose 7 preferably is manufactured so as to have longitudinal flexibility combined with circumferential stiffness, which allows it to bend without collapsing. One suitable type of hose material for this embodiment is polyvinyl chloride (PVC) blower/vacuum hose that is reinforced with a molded-in spiral steel wire.

The present invention provides a blend of fish and other aquatic organism habitat that enhances the movement of nutrients into and through an aquatic food chain. For instance, scuds (*Gammarus* sp) can occur on the edge habitat associated with anoxic or anaerobic water, and the present invention maximizes such edge habitat. Adjustable flow rate through stream channels also provides for variable flowing water habitat, which in turn allows for conditions appropriate to specific minnow species, many of which consume periphyton, and accordingly facilitates the movement of nutrients into and through an aquatic food chain. Similarly, adjustable water flow, dissolved oxygen levels and water temperature can be manipulated to provide habitat optimization means for both fresh and salt water mussels, as well as oysters.

Shallow-water flow zones can provide additional optimized feeding habitat for shorebird species that prefer to feed on living scuds and insects in shallow water. As explained above, these shallow water zones can be provided by installing side exit channels within the treatment channels, and the flow rate and resulting water depth within the side exit channels may optionally be periodically varied in order to attract certain species of shorebirds.

Cycling intake water from various strata provides similar food opportunities for fish. For example, while suspended nutrient solids may be concentrated in a deep water strata, snails and zooplankton may be present in another, which in turn allows for management of food relative to a wide variety of animal species. The present invention provides a comprehensive ability to duplicate a range of aquatic and riparian edge and floodplain habitat. Each of these different habitat settings provides another food chain opportunity.

Although the preferred embodiment of the present invention has been shown and described, it will be apparent to those skilled in the art that many changes and modifications may be made without departing from the invention in its broader aspects, The appended claims are therefore intended to cover all such changes and modifications as fall within the true spirit and scope of the invention.

We claim:

1. A floating streambed comprising:
   (a) a circulation pump having an inlet hose or pipe;
   (b) an inlet hose or pipe depth adjuster; and
   (c) one or more treatment channels comprised of permeable matrix;
   wherein the floating streambed floats on a water body;
   wherein water enters the inlet hose or pipe from the water body and is pumped by the circulation pump into the treatment channels; and
   wherein the treatment channels are comprised of permeable matrix, and water entering the treatment channels flows both horizontally through the treatment channel and into the water body and also vertically downward through the permeable matrix of the treatment channels.

2. A floating streambed comprising:
   (a) a circulation pump having an inlet hose or pipe;
   (b) an inlet hose or pipe depth adjuster; and
   (c) one or more treatment channels comprised of permeable matrix;
   wherein the floating streambed floats on a stratified water body comprising a surface layer, an intermediate layer and a deep layer;
   wherein water enters the inlet hose or pipe from the surface, intermediate or deep layer of the water body and is pumped by the circulation pump into the treatment channels; and
   wherein the treatment channels are comprised of permeable matrix, and water entering the treatment channels flows both horizontally through the treatment channel and into the surface layer of the water body and vertically downward through the permeable matrix of the treatment channels.

3. The floating streambed of claim 1 or 2, wherein each treatment channel has at least two sides comprised of permeable matrix, and wherein the water entering the treatment channel also flows horizontally through the permeable matrix on either side of the treatment channel.

4. The floating streambed of claim 1 or 2, wherein each treatment channel has at least two sides, and further comprising walkways positioned on one or both sides of each treatment channel.

5. The floating streambed of claim 4, wherein the walkways are comprised of molded, fiberglass-reinforced plastic grating.

6. The floating streambed of claim 1 or 2, further comprising a plurality of flotation units that are integral to the treatment channels.

7. The floating streambed of claim 6, wherein the flotation units are comprised of polyurethane resin that is injected into the permeable matrix under pressure and in liquid form and then expands and cures in place.

8. The floating streambed of claim 1 or 2, further comprising a bubbler located within the inlet pipe or hose or within a treatment channel that bubbles air into the water that is pumped into the treatment channels.

9. The floating streambed of claim 1 or 2, wherein at least one of the treatment channels comprises a top cover.

10. The floating streambed of claim 1 or 2, wherein each treatment channel comprises a bottom and sides, and at least one of the treatment channels comprises a periphyton layer on the bottom and sides of the treatment channel.

11. The floating streambed of claim 10, further comprising a removable liner to facilitate removal and harvest of periphyton.

12. The floating streambed of claim 1 or 2, wherein each treatment channel comprises a bottom and sides, and at least one of the treatment channels comprises an impermeable liner on the bottom and sides of the treatment channel.

13. The floating streambed of claim 1 or 2, wherein the permeable matrix is comprised of nonwoven polymer fibers.

14. The floating streambed of claim 13, wherein the nonwoven polymer fibers are polyester fibers that are intertwined to form a randomly oriented blanket.

15. The floating streambed of claim 13, wherein the nonwoven polymer fibers are recycled scrap carpet fibers.

16. The floating streambed of claim 1 or 2, and wherein aquatic, riparian and/or terrestrial plants are added to the treatment channel to increase removal of excess nutrients from the water in the treatment channel.

17. The floating streambed of claim 1 or 2, wherein each treatment channel has at least two sides comprised of permeable matrix with a top surface, and wherein aquatic, riparian and/or terrestrial plants are added to the top surface of the permeable matrix of the sides of the treatment channel to increase removal of excess nutrients from water in or entering the water body.

18. The floating streambed of claim 1 or 2, wherein each treatment channel comprises a bottom and sides, further comprising sod that is attached to the bottom and/or sides of the treatment channel.

19. The floating streambed of claim 1 or 2, wherein bedding plants or plugs and/or seeds are inserted into precut holes within the permeable matrix of the treatment channel.

20. The floating streambed of claim 1 or 2, wherein at least one treatment channel comprises one or more three-dimensional baffles, and wherein the baffles produce a longer flow path for the water in the treatment channel.

21. The floating streambed of claim 1 or 2, wherein each treatment channel comprises two sides, wherein at least one treatment channel comprises a filter comprised of permeable matrix, and wherein the filter extends from one side of the treatment channel to the other.

22. The floating streambed of claim 1 or 2, wherein each treatment channel comprises two sides, wherein at least one treatment channel comprises an absorbent filter comprised of an outer support frame and an absorbent fill material, and wherein the filter extends from one side of the treatment channel to the other.

23. The floating streambed of claim 22, wherein the outer support frame is comprised of permeable matrix.

24. The floating streambed of claim 1 or 2, wherein each treatment channel comprises two sides, wherein at least one of the treatment channels comprises a floating treatment island, and wherein the floating treatment island floats on the water in the treatment channel and is comprised of permeable matrix, a plurality of flotation units, and tethering cables that tether the floating treatment island between the sides of the treatment channel.

25. The floating streambed of claim 1 or 2, wherein each treatment channel comprises two sides, wherein at least one of the treatment channels comprises an overhanging treatment bank, and wherein the overhanging treatment bank floats on the water in the treatment channel and is comprised of permeable matrix, a plurality of flotation units, and tethering cables that tether the overhanging treatment bank to one side of the treatment channel such that the overhanging treatment bank abuts up against the side of the treatment channel.

26. The floating streambed of claim 1 or 2, wherein each treatment channel comprises two side walls, wherein at least one treatment channel comprises a side exit channel and a lowered elevation of a side wall to provide a relatively shallow stream section as compared to the water in the treatment channel.

27. The floating streambed of claim 1 or 2, wherein the water body has a bottom, further comprising a sludge input system comprising a sludge pump and a sludge inlet pipe or hose with an inlet end at the bottom of the water body, wherein the sludge pump pumps sludge from the bottom of the water body and mixes it with the water that is pumped into the treatment channels.

28. The floating streambed of claim 1 or 2, wherein the water body has a bottom, further comprising a surface water input system comprising a surface water pump and a surface water inlet hose or pipe with an inlet end in the surface layer of the water body, wherein the surface water pump pumps surface water from the surface layer of the water body and mixes it with the water that is pumped into the treatment channels.

29. The floating streambed of claim 1 or 2, wherein the inlet hose or pipe has an inlet end, further comprising an inlet filter surrounding or inside the inlet end of the inlet hose or pipe, wherein the inlet filter is comprised of permeable matrix.

30. The floating streambed of claim 1 or 2, wherein each treatment channel comprises a bottom and sides, wherein the bottom and sides of the treatment channel are comprised of permeable matrix with a certain thickness, wherein the water entering the treatment channel remains in the treatment channel for a certain residence time, and wherein the residence time of the water in the treatment channel is adjusted by varying the thickness of the permeable matrix of the bottom and/or sides of the treatment channel.

31. The floating streambed of claim 1 or 2, wherein each treatment channel has a length, wherein the water entering the treatment channel remains in the treatment channel for a certain residence time, and wherein the residence time of the water in the treatment channel is adjusted by varying the length of the treatment channel.

32. The floating streambed of claim 1 or 2, wherein the circulation pump pumps water into the treatment channel at a certain rate, wherein the water entering the treatment channel remains in the treatment channel for a certain residence time, and wherein the residence time of the water in the treatment channel is adjusted by varying the rate at which the circulation pump pumps water into the treatment channel.

33. The floating streambed of claim 2, further comprising a discharge pipe that discharges a portion of the water from the treatment channels into the intermediate or deep layer of the water body.

34. The floating streambed of claim 33, wherein the depth of the discharge pipe is adjustable.

35. A floating streambed system comprising:
   (a) a floating streambed with at least one treatment channel with a bottom and sides comprised of permeable matrix;
   (b) one or more inlet valves situated in an upper water body; and
   (c) an inlet hose or pipe connecting the inlet valve(s) to the treatment channel;
   wherein the floating streambed floats on a lower water body; and
   wherein water flows by gravity from the upper water body into the inlet hose or pipe and into the treatment channel, where it flows horizontally through the treatment channel, horizontally through the permeable matrix of the sides of the treatment channel and/or vertically downward through the bottom of the permeable matrix of the treatment channel into the lower water body.

36. A floating streambed comprising:
   (a) a circulation pump; and
   (b) one or more treatment channels comprised of permeable matrix;
   wherein the floating streambed floats on a water body;
   wherein water is pumped by the circulation pump into the treatment channels; and
   wherein the treatment channels are comprised of permeable matrix, and water entering the treatment channels flows both horizontally through the treatment channel and into the water body and also vertically downward through the permeable matrix of the treatment channels.

37. A floating streambed comprising:
   (a) a circulation pump; and
   (b) one or more treatment channels comprised of permeable matrix;
   wherein the floating streambed floats on a stratified water body comprising a surface layer, an intermediate layer and a deep layer;
   wherein water is pumped by the circulation pump from the surface, intermediate or deep layer of the water body into the treatment channels; and
   wherein the treatment channels are comprised of permeable matrix, and water entering the treatment channels flows both horizontally through the treatment channel and into the surface layer of the water body and vertically downward through the permeable matrix of the treatment channels.

\* \* \* \* \*